United States Patent
Leite Pinheiro de Paiva et al.

(10) Patent No.: US 11,341,097 B2
(45) Date of Patent: May 24, 2022

(54) PREFETCHING BASED ON HISTORICAL USE AND REAL-TIME SIGNALS

(71) Applicant: Microsoft Technology Licensing, LLC, Redmond, WA (US)

(72) Inventors: Joao Celestino Leite Pinheiro de Paiva, Sammamish, WA (US); Sriram Dhanasekaran, Kirkland, WA (US); Dmitry Pugachev, Medina, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/654,965

(22) Filed: Oct. 16, 2019

(65) Prior Publication Data

US 2021/0117384 A1    Apr. 22, 2021

(51) Int. Cl.
*G06F 16/172*    (2019.01)
*G06F 16/182*    (2019.01)
(Continued)

(52) U.S. Cl.
CPC .......... *G06F 16/172* (2019.01); *G06F 16/134* (2019.01); *G06F 16/148* (2019.01); *G06F 16/182* (2019.01)

(58) Field of Classification Search
CPC .................................................. G06F 16/172
See application file for complete search history.

(56) References Cited

U.S. PATENT DOCUMENTS

| 5,737,747 A | * | 4/1998 | Vishlitzky | G06F 12/0866 348/E5.008 |
| 6,779,119 B1 | * | 8/2004 | Moshfeghi | G06F 16/172 726/23 |

(Continued)

FOREIGN PATENT DOCUMENTS

| WO | 2015095065 A1 | 6/2015 |
| WO | 2019120037 A1 | 6/2019 |

OTHER PUBLICATIONS

"Autoregressive Integrated Moving Average", Retrieved from https://web.archive.org/web/20190107220655/https://en.wikipedia.org/wiki/Autoregressive_integrated_moving_average, Published on Jan. 7, 2019, 6 Pages.

(Continued)

*Primary Examiner* — Esther B. Henderson
(74) *Attorney, Agent, or Firm* — Fiala & Weaver P.L.L.C.

(57) ABSTRACT

Methods, systems and computer program products are provided for prefetching based on historical use and real-time signals. Forecast models may be configured to forecast whether to prefetch information (e.g. keys responsive to queries) for future time intervals based on historical use and internal or external signals that may influence forecasts, such as prevailing conditions. Historical use of keys may be analyzed for patterns and trends with multiple seasonalities per category and/or per key. Time series data and forecasts may be indexed by cache categories and time intervals. Forecast models may be trainable, optimizable, configurable and/or auto-correcting on a per-category and/or a per-key basis. Forecast precision indicators, confidence indicators and configurable thresholds may be used to optimize performance. Operations may be distributed among multiple servers. Tasks may be time-distributed by offsets. Cached (Continued)

information may be assigned a time to live (TTL) independent of other cached information.

20 Claims, 11 Drawing Sheets

(51) Int. Cl.
    *G06F 16/14* (2019.01)
    *G06F 16/13* (2019.01)

(56) References Cited

U.S. PATENT DOCUMENTS

| | | | | |
|---|---|---|---|---|
| 7,979,415 | B2* | 7/2011 | Shen | G06Q 30/0241 |
| | | | | 707/706 |
| 8,769,691 | B1* | 7/2014 | Hsueh | H04L 63/1441 |
| | | | | 726/24 |
| 9,942,312 | B1* | 4/2018 | Langseth | H04L 67/101 |
| 2010/0057687 | A1* | 3/2010 | Shen | G06F 16/3322 |
| 2013/0159383 | A1* | 6/2013 | Tuliani | H04L 67/2842 |
| | | | | 709/203 |
| 2013/0226837 | A1 | 8/2013 | Lymberopoulos et al. | |
| 2014/0359074 | A1* | 12/2014 | Igelka | G06F 16/9574 |
| | | | | 709/219 |
| 2014/0373032 | A1 | 12/2014 | Merry et al. | |
| 2021/0319306 | A1 | 10/2021 | Leite Pinheiro De Paiva et al. | |

OTHER PUBLICATIONS

"Azure Data Lake Storage Gen2 Pricing", Retrieved from https://azure.microsoft.com/en-us/pricing/details/storage/data-lake/. Retrieved on Sep. 3, 2019, 10 Pages.

"Azure Databricks Pricing", Retrieved from https://web.archive.org/web/20190330125854/https://azure.microsoft.com/en-us/pricing/details/databricks/, Published on Mar. 30, 2019, 24 Pages.

"Event Hubs Pricing", Retrieved from https://web.archive.org/web/20150113062116/https://azure.microsoft.com/en-us/pricing/details/event-hubs/. Published on Jan. 13, 2015, 7 Pages.

"Exponential Smoothing", Retrieved from https://web.archive.org/web/20150331014215/https://en.wikipedia.org/wiki/Exponential_smoothing, Published on Mar. 31, 2015, 7 Pages.

"International Search Report and Written Opinion Issued in PCT Application No. PCT/US20/054648", dated Dec. 17, 2020, 10 Pages.

"International Search Report and Written Opinion Issued in PCT Application No. PCT/US2021/018083", dated May 7, 2021, 10 Pages.

* cited by examiner

PREFETCHING BASED ON HISTORICAL USE AND REAL-TIME SIGNALS

BACKGROUND

Response times to requests for information from data servers may be reduced by storing information locally. However, due to limited storage capacity, certain storage policies may be implemented, such as evicting least recently used (LRU) information. Such storage policies may lead to delays and slower response times by forcing retrieval of information from a remote source.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are provided for prefetching based on historical use and real-time signals. Forecast models may be configured to forecast whether to prefetch information (e.g. keys responsive to queries) for future time intervals based on historical use and internal or external signals that may influence forecasts, such as prevailing conditions. Historical use of keys may be analyzed for patterns and trends with multiple seasonalities per category and/or per key. Time series data and forecasts may be indexed by cache categories and time intervals. Forecast models may be trainable, optimizable, configurable and/or auto-correcting on a per-category and/or a per-key basis. Forecast precision indicators, confidence indicators and configurable thresholds may be used to optimize performance. Operations (e.g. data aggregation, transformation, forecasting, scheduling and prefetching) may be distributed among multiple servers. Tasks may be time-distributed by offsets. Cached information may be assigned a time to live (TTL) independent of other cached information.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 7A:
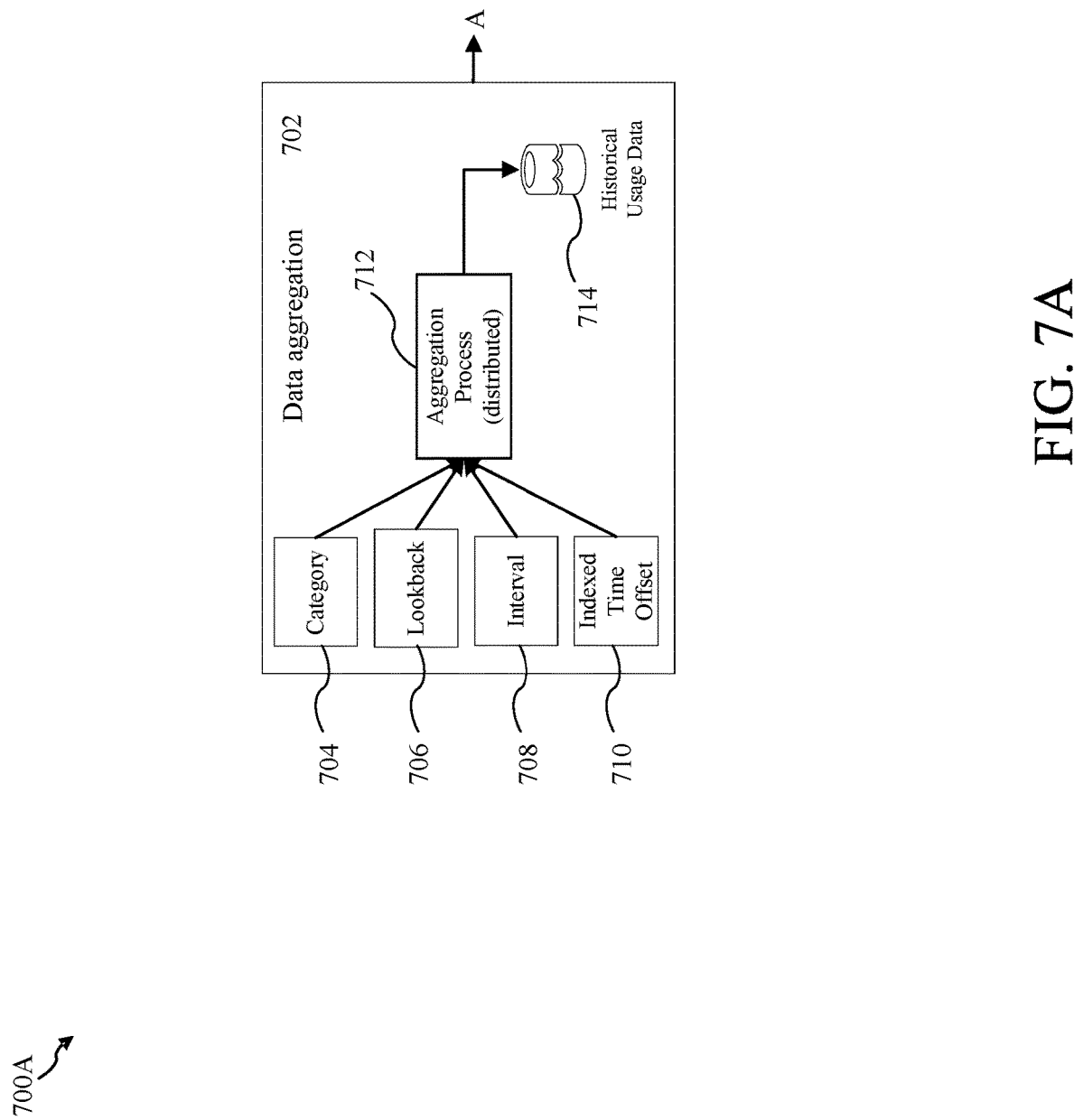
Figure 7B:
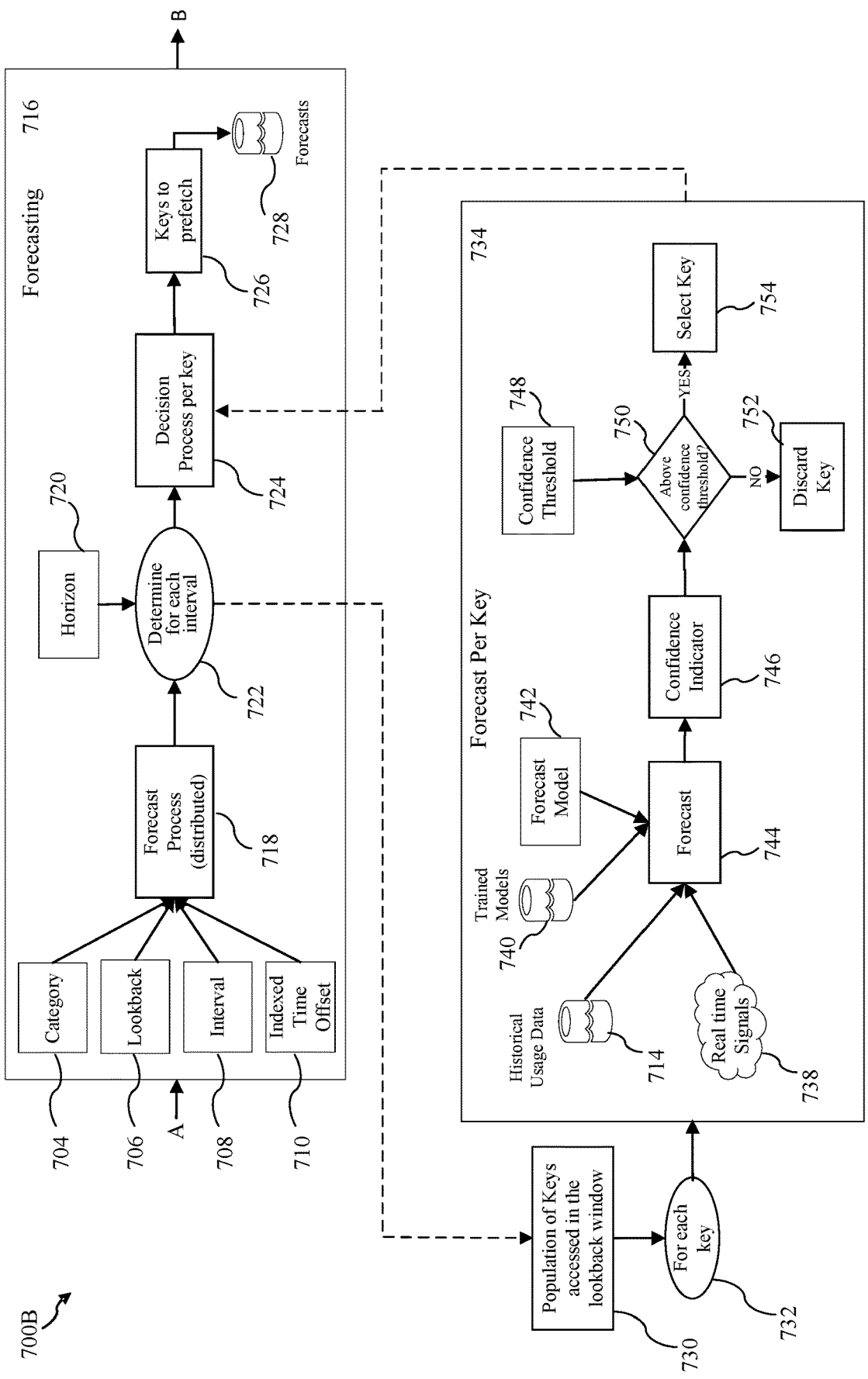
Figure 7C:
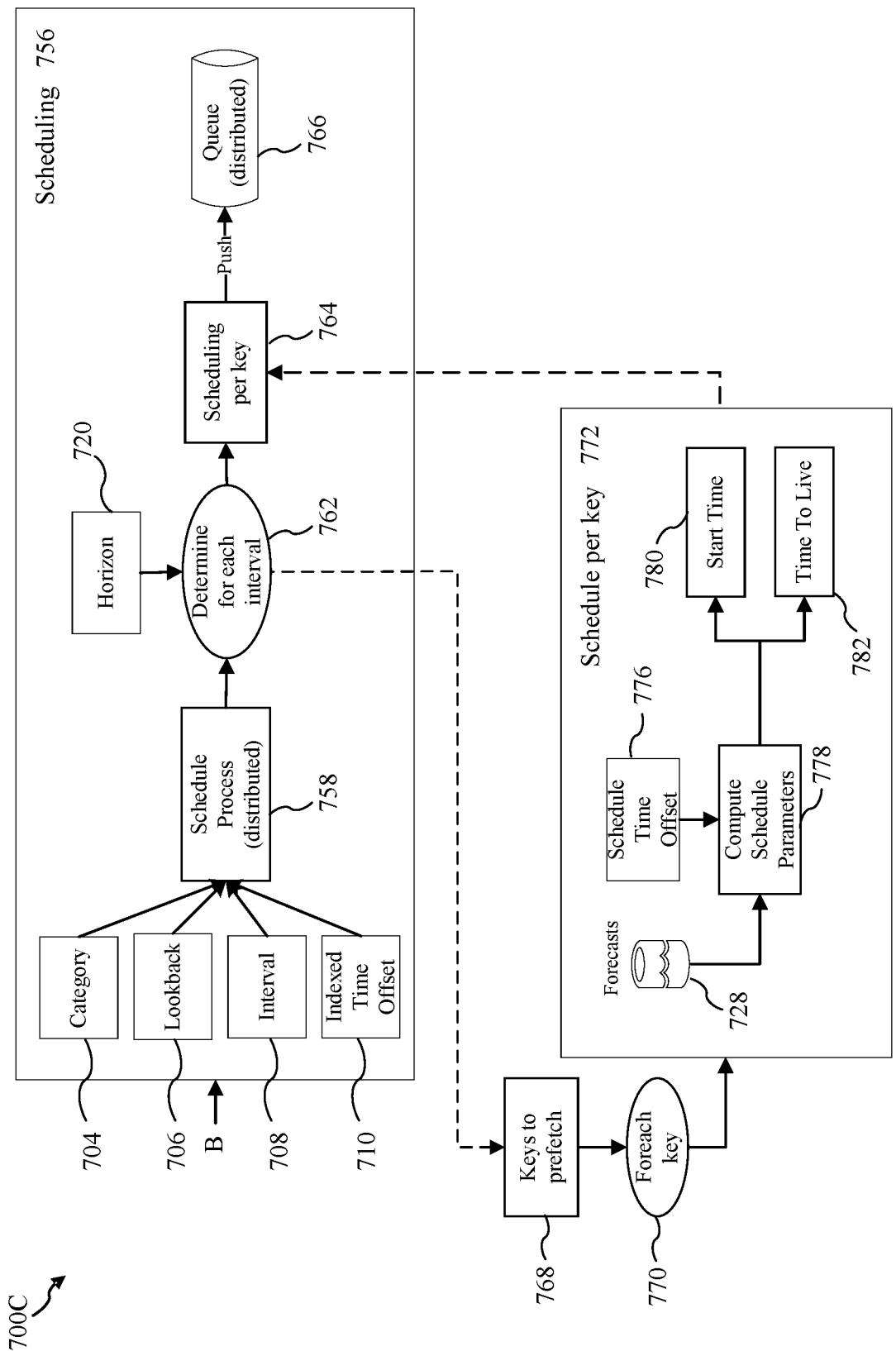

FIGS. 7A-C show an example data and process flow diagram for prefetching based on historical use and real-time data, according to an example embodiment.

Figure 8:
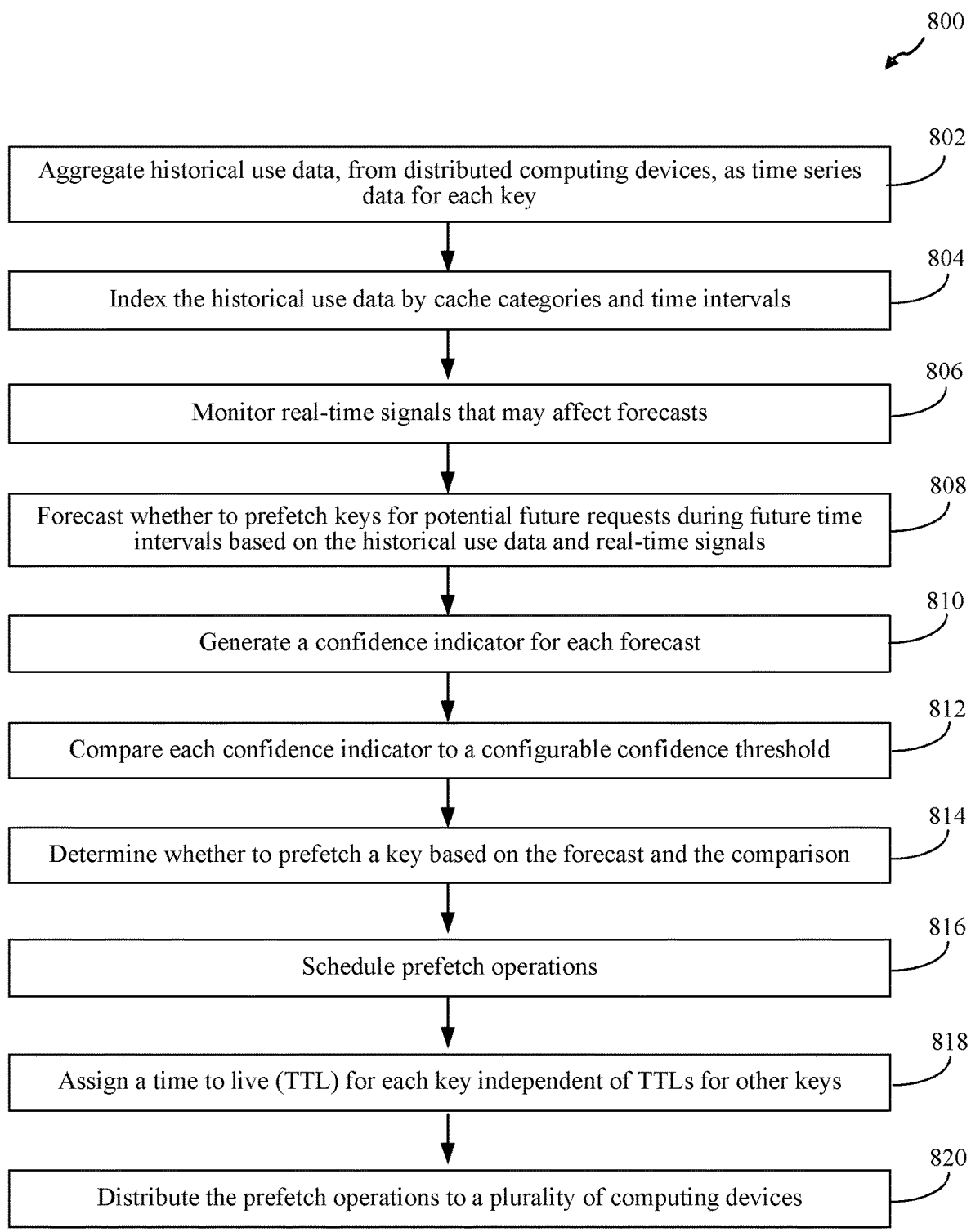

FIG. 8 shows a flowchart of a method for prefetching based on historical data and real time signals, according to an example embodiment.

Figure 9:
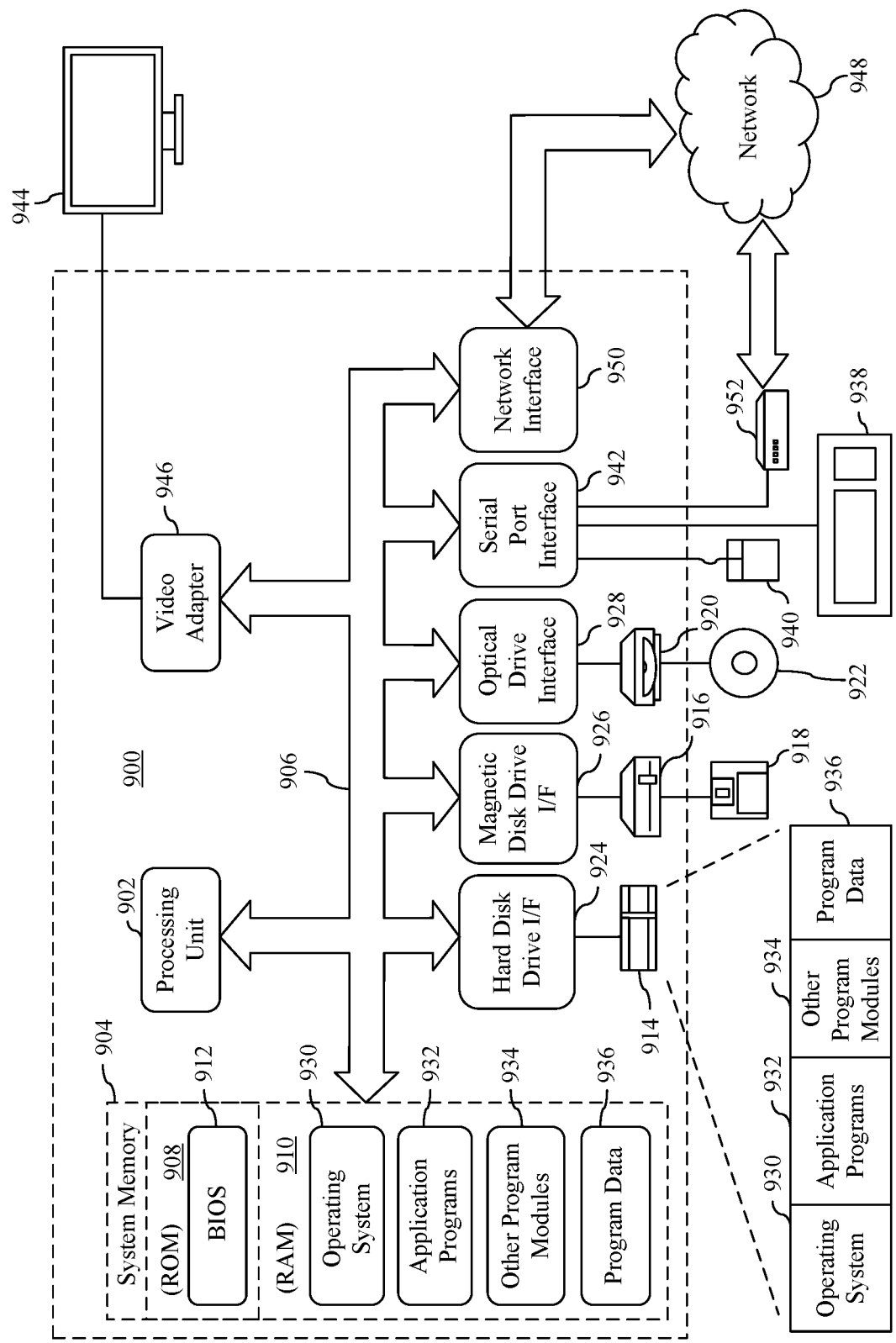

FIG. 9 shows a block diagram of an example computing device that may be used to implement example embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Information services, whether running in the cloud or on a device, may use caching mechanisms to index data, e.g., to improve query execution and reduce response times. Cache may (e.g. besides indexing data) store additional data (e.g. metadata), which may be used to serve incoming requests. Outbound requests to remote data sources over one or more networks (e.g. easily tens to hundreds of times slower) may be avoided by caching the data. Data stored in cache may be bound to the size limits and eviction policies, such as least recently used (LRU) and/or a time window (e.g. time to live or TTL). Data may not be available in cache when requested (e.g. a cache miss) due to a failure to cache or LRU, TTL or other cache policies. A cache hit ratio may be improved while conforming with cache size limits and/or eviction policies.

Methods, systems and computer program products are provided for prefetching based on historical use and real-time signals. Forecast models may be configured to forecast whether to prefetch information (e.g. keys responsive to queries) for future time intervals based on historical use and internal or external signals that may influence forecasts, such as prevailing conditions. Historical use of keys may be analyzed for patterns and trends with multiple seasonalities per category and/or per key. Time series data and forecasts may be indexed by cache categories and time intervals. Forecast models may be trainable, optimizable, configurable and/or auto-correcting on a per-category and/or a per-key basis. Forecast precision indicators, confidence indicators and configurable thresholds may be used to optimize performance. Operations (e.g. data aggregation, transformation, forecasting, scheduling and prefetching) may be distributed among multiple servers. Tasks may be time-distributed by offsets. Cached information may be assigned a time to live (TTL) independent of other cached information.

Figure 1:
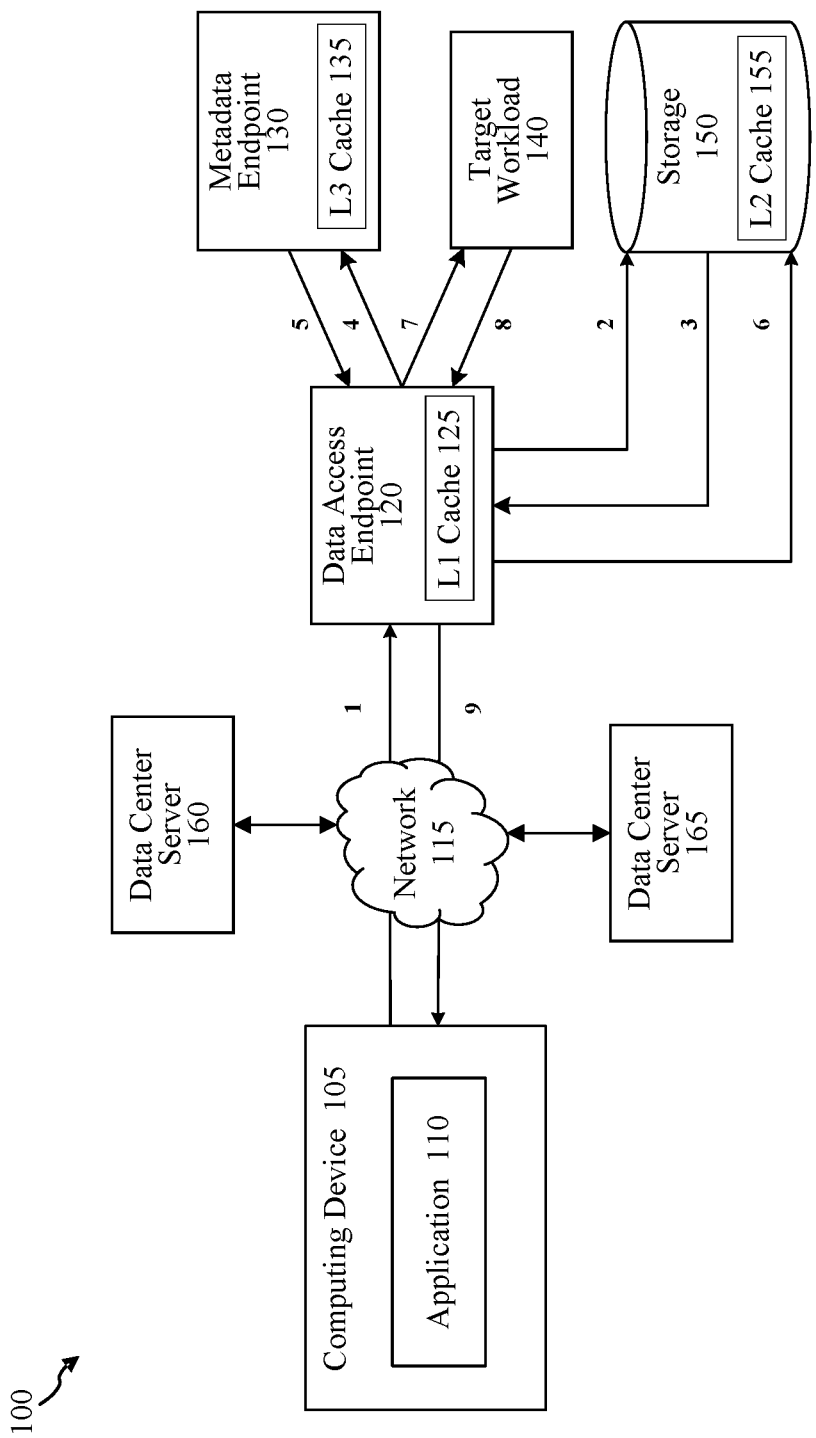
FIG. 1 is a block diagram of an example query response system that may be configured to prefetch information based on historical use and real-time signals, according to an example embodiment.

FIG. 1 is a block diagram of an example query response system that may be configured to prefetch information based on historical use and real-time signals, according to an example embodiment. Example system 100 may comprise, for example, computing device 105 executing application 110, network 115, data access endpoint 120, metadata endpoint 130 and target workload 140, storage 150, data center server 160 and data center server 165. FIG. 1 presents one of many computing environments that may implement subject matter described herein. For example, in an (e.g. alternative) example of a query response system, metadata endpoint 130 (and associated L3 cache 135 and steps 4 and 5) may not be implemented.

Computing device 105 may comprise any computing device. In an example, there may be tens, hundreds, thousands, millions or more computing devices with applications 110 configured to access data access endpoint 120. Computing device 105 may be, for example, any type of stationary or mobile computing device, such as a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 105 may comprise one or more applications, operating systems, virtual machines, storage devices, etc. that may be executed, hosted, and/or stored therein or via one or more other (e.g. networked) computing devices. In an example, computing device 105 may access one or more server computing devices (e.g. over a network). Computing device 105 may comprise application 110. An example computing device with example features is presented in FIG. 9.

Application 110 may comprise any type of application. Application 110 may comprise one or more executable programs, dynamic link libraries (DLLs), etc. Application 110 may use representational state transfer (REST) APIs or software development kits (SDKs), for example, to access and interact with data access endpoint 120. Application 110 may be developed in an application development framework. In an example, application 110 may comprise a .NET (dot-net) application created in a .NET framework. Dot-net is a cross-platform, open source developer platform for building many different types of applications with many different languages, editors and libraries available to build applications for many different environments (e.g. web, mobile, desktop, gaming, and Internet of Things (IoT) environments). Application 110 may interact with a model, integrate a model, support model development, etc. For example, a model associated with application 110 may comprise a machine learning (ML) model developed with ML.NET.

Network 115 may include one or more of any of a local area network (LAN), a wide area network (WAN), a personal area network (PAN), a combination of communication networks, such as the Internet, and/or a virtual network. In example implementations, computing device 105 and data access endpoint 120 may be communicatively coupled via network 105. Data access endpoint 120 and computing device 105 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Data access endpoint 120 may comprise, for example, one or more data access servers, such as one or more Microsoft Graph servers. Data access endpoint 120 may, for example, comprise a front end (FE) of a data center. There may be multiple servers in a data center, such as data center server 160 and data center server 165 (e.g. among other servers and other resources). A workload may be partitioned and distributed among multiple servers, for example, to improve performance (e.g. response time), balance server loading, etc. In an example, data access endpoint 120 may partition and distribute a workload among multiple servers, such as collecting (e.g. aggregating) data, transforming data, analyzing data, executing a prediction model to forecast data that may be requested, determining whether to prefetch data (e.g. metadata) that may be requested, prefetching data and so on.

In an example, data access endpoint 120 may allow application developers to integrate a variety of services and data sources Data access endpoint 120 may support interactions (e.g. communication) with application 110 (e.g. via computing device 105), metadata endpoint 130, target workload 140 and storage 150. Data access endpoint 120 may provide application programming interfaces (APIs) for application 110 to access data. Data access endpoint 120 may manage storing, processing, and securing and retrieving data responsive to requests from application 110. Data access endpoint 120 may provide information to application 110, for example, to support various scenarios, such as productivity, collaboration, education, machine-learning, model predictions, security, identity, access, and device management. Data access endpoint 120 may provide a set of tools to streamline secure and scalable delivery of data for intelligent applications. Data responsive to requests/queries may be stored in L1 cache 125, L2 cache 155, L3 cache 135 or other data locations. In various implementations, there may be multiple data access endpoints 120, which may share common (e.g. global) L2 cache 155.

L1 cache 125, L2 cache 155 and L3 cache may, for example, store additional data (e.g. metadata), which may be referred to as keys, that may be used to serve incoming requests. In an example, a key may be used to construct a response to one or more requests. Cache entries of keys may be divided into categories. In an example, a first category may map user IDs to principal names. TTLs for cached keys may be configured per category and/or per key, for example.

L1 cache 125 may comprise local cache (e.g. cache for each virtual machine (VM)). L2 cache 155 may comprise, for example, distributed (e.g. Redis) cache for each region. L3 cache may comprise, for example, metadata source cache, which may be located anywhere. Each of multiple cache categories may map to a different metadata type.

Step numbers 1-9 show an example procedure where application 110 makes a request (1) and data access endpoint 120 provides a response (9). Data access endpoint 120 may search L1 cache 125 for responsive information before checking L2 cache 155 (steps 2, 3), L3 cache 135 (steps 4, 5) or generates target workload 140 (steps 7, 8) to retrieve or generate information. Step 6 may indicate an operation to cache metadata returned from metadata endpoint 130 in (e.g. global) L2 cache 155, for example, to make it available globally to (e.g. all) data access endpoints (e.g. data access endpoint 120).

Metadata endpoint 130 may comprise a source of metadata. Metadata endpoint 130 may comprise, for example, one or more data access servers. Endpoint resource types such as metadata endpoint 130 may represent URLs for resources associated with an entity, such as L3 cache 135. Metadata endpoint 130 may cache data, such as metadata, in L3 cache 135. Metadata endpoint 130 may support interactions with data access endpoint 120, for example, to provide metadata from L3 cache 135 that was not found in L1 cache 125 by data access endpoint 120.

Target workload 140 may be generated by data access endpoint 120, for example, to obtain or generate information responsive to a request/query, e.g., when data access endpoint 120 does not find information responsive to a request in cache (e.g. L1 cache 125, L2 cache 155 or L3 cache 135). Data returned by target workload 140 may be cached (e.g. L1 cache 125, L2 cache 155 or L3 cache 135).

Storage 150 may comprise one or more storage devices. Storage 150 may comprise cache (e.g. L2 cache 155). Storage 150 may store data and/or programs (e.g. information). Data may be stored in storage 150 in any format, including tables. Storage 150 may comprise, for example, an in-memory data structure store (e.g. Redis) implementing a distributed, key-value database, which may support, for example, data structures such as strings, hashes, lists, sets, sorted sets with range queries, bitmaps, hyperlog logs, geospatial indexes with radius queries and streams.

Steps 2-8 pertaining to cache misses in L1 cache 125, L2 cache 155 or L3 cache 135 serve to demonstrate that it is preferable to accurately predict requests, prefetch and store information responsive to requests (1) in L1 cache 125, for example, to avoid delays associated with steps 2-8.

Cache misses (e.g. in L1 cache 125, L2 cache 155 or L3 cache 135) may be reduced (e.g. to avoid steps 2-8) and improve performance (e.g. reduce response latency), for example, by implementing a cache prefetch system, which may operate in the background to cache keys before data access front ends receive requests. Prefetching decisions and cached keys (e.g. for future requests) may be based on analyses of historical requests and/or responsive information (e.g. such as keys accessed) to find patterns alone or in combination with real-time signals (e.g. drivers) that may influence future requests. Prefetch prediction algorithms may be, for example, univariate or multivariate. Multivariate algorithms may account for drivers that influence predictions based on historical usage, such as real-time signals. Prediction algorithms may comprise machine learning (ML) models, which may be created, trained and implemented, for example, using ML.NET.

Figure 2:
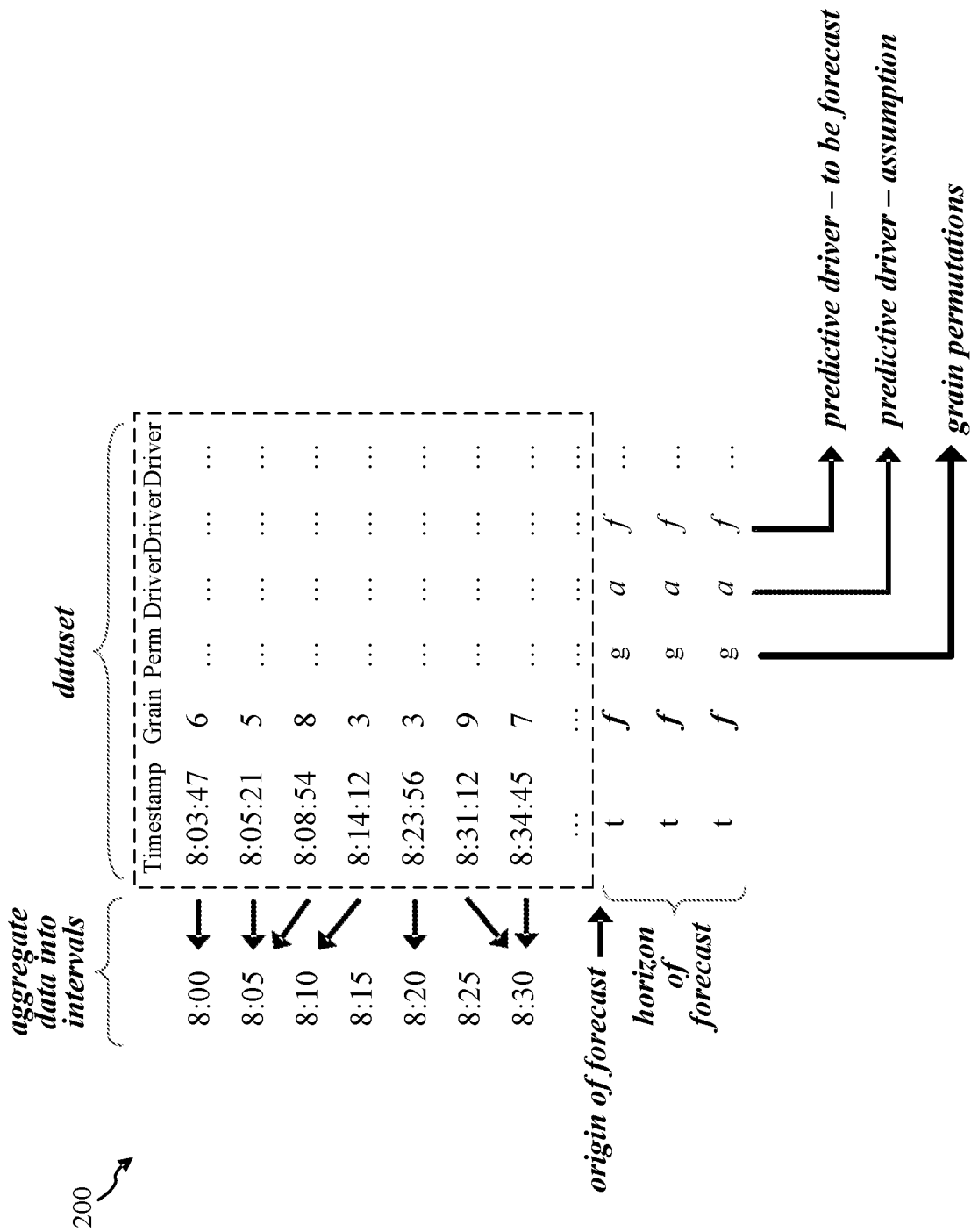
FIG. 2 is an example of using a dataset in a multivariate prediction algorithm to determine prefetching, according to an example embodiment.

FIG. 2 is an example of using a dataset in a multivariate prediction algorithm to determine prefetching, according to an example embodiment. Example 200 shows an example of a timestamped dataset and how it may be used in a multivariate prediction algorithm (e.g. to prefetch keys). A dataset may comprise information to be evaluated by a prediction model, such as, for example, a timestamp, a grain, a permutation, a driver, etc.

A dataset may pertain to one or more categories and/or keys in one or more categories. A dataset may provide a lookback into the past, e.g., to train a model to predict the future in a forecast process. A lookback may be timeless, bound to computational limits to process the data. In an example, a lookback may comprise a rolling window. For example, a rolling window of a number of days, weeks or months may be used to detect seasonality. Seasonality (e.g. in time series data) may indicate patterns or variations that occur at recognizable intervals (e.g. hourly, daily, weekly, monthly, quarterly request patterns). A timestamp for a data entry in a dataset may comprise, for example, a time that an entry in a dataset was generated. A grain may comprise the number of times a key (e.g. hashed metadata) was accessed in a time window/interval (e.g. to respond to a request). A grain may have permutations. A forecast may be provided for a (e.g. each) permutation of grain values. A driver may comprise an internal or external signal (e.g. a real time signal) that may influence an access pattern of a given category or key. Predictive drivers may include known or estimated assumptions. Predictive drivers may be predicted in a forecast, for example, based on training data.

Data in a dataset may be prepared or transformed for a prediction algorithm. A time interval may be used to aggregate and index data on (e.g. fixed) intervals. In an example, timestamped data may be aggregated, for example, in 5-minute interval samples. Sampling (e.g. aggregating) data in (e.g. time) intervals (e.g. without sacrificing too much resolution) may, for example, reduce computation cycles, consumption of memory and storage resources in a forecast process and improve the overall performance of a model, without compromising the accuracy of results. For example, assuming a minimum time to live (TTL) for prefetched keys in a given category is 1 hour, a system may be configured to aggregate data in 30 minutes intervals. In the example shown in FIG. 2, data in the dataset is aggregated into five-minute intervals for processing by a prediction algorithm.

Figure 3:
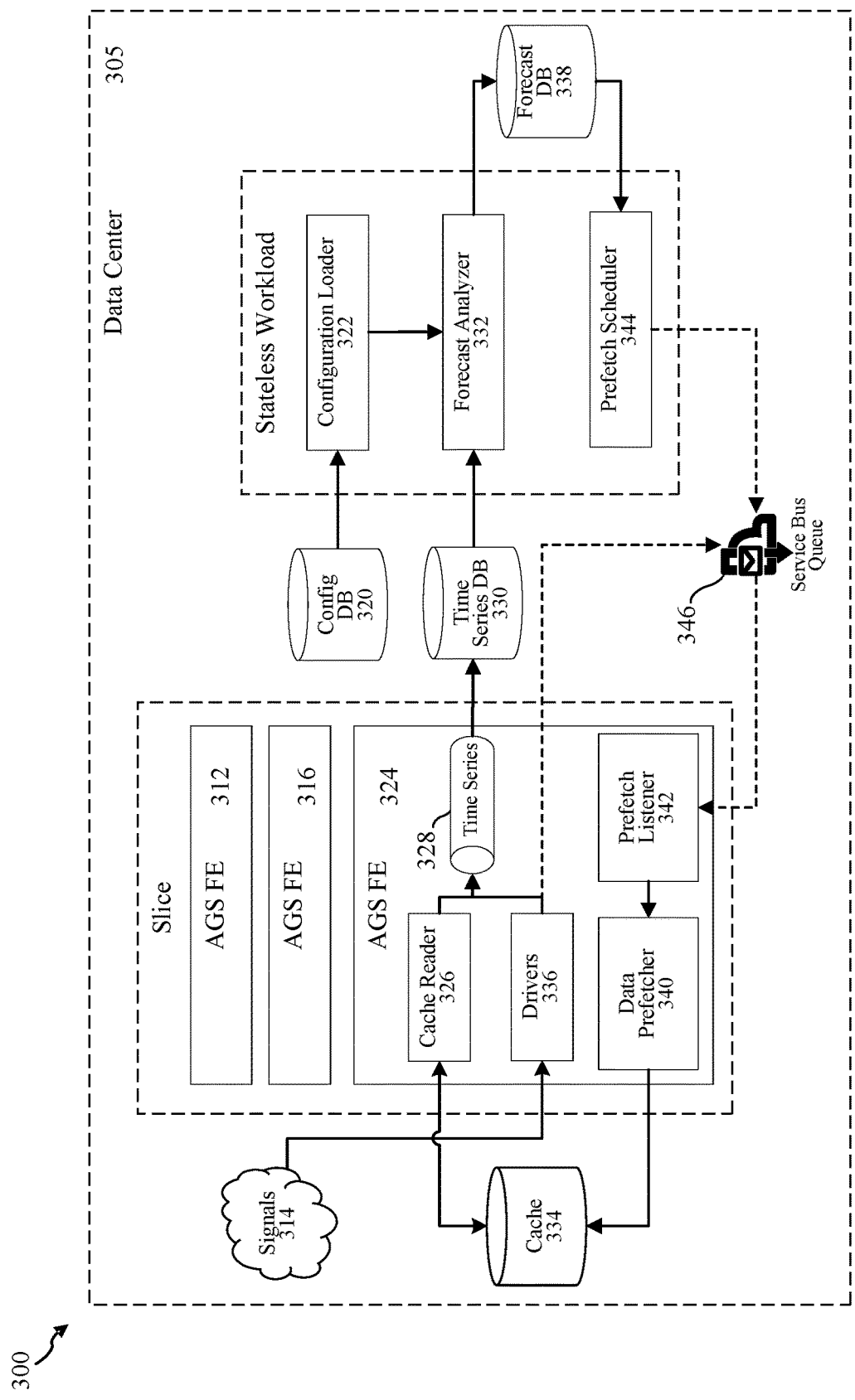
FIG. 3 is a block diagram of an example prefetching architecture based on historical use and driver signals, according to an example embodiment.
Figure 4:
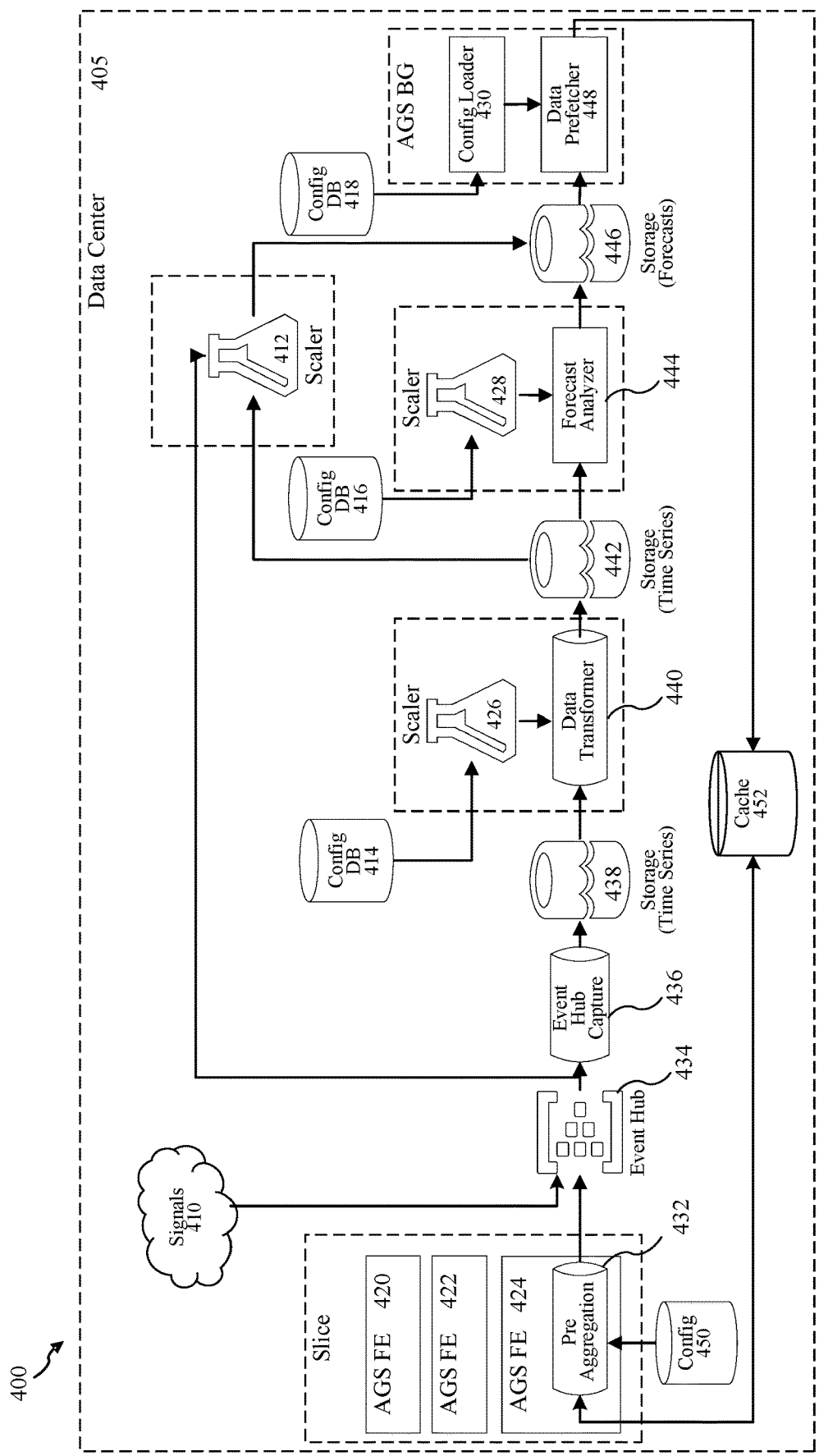
FIG. 4 is a block diagram of an example prefetching architecture based on historical use and driver signals, according to an example embodiment.
Figure 5:
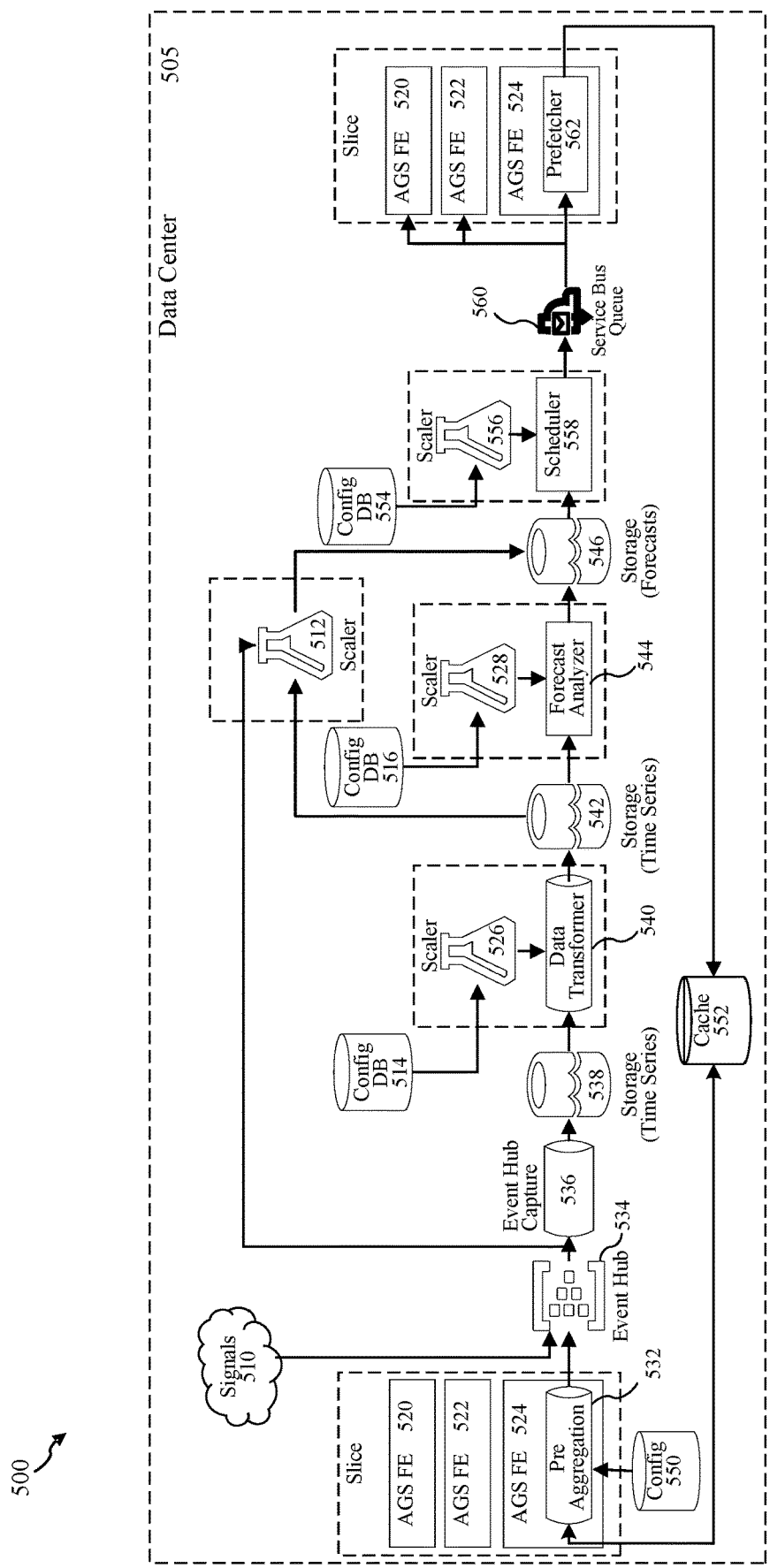
FIG. 5 is a block diagram of an example prefetching architecture based on historical use and driver signals, according to an example embodiment.

FIGS. 3-5 present example architectures for cache prefetching based on historical use data and real-time drivers. FIGS. 7A-C present an example data flow diagrams followed by example flowcharts.

A prefetch system may prefetch keys using a time series analysis and real-time signals to predict keys that may be needed in upcoming time windows. Access patterns may be determined by category and/or by key. Caching decisions (whether to prefetch a key, TTL) may be category and/or key specific. In an example, an access pattern for a category or specific key may follow a business hours trend (in local time). Different keys under the same category may have different access patterns. Access patterns may change (e.g. significantly) over time and/or based on influences (e.g. drivers), such as weather events and holidays. A model may be dynamic and may auto correct based on historical data and other contextual signals, e.g., on a per-category and/or a per-key basis.

Prefetching determinations may be similar to weather forecasting, for example, where future weather may be predicted using historical temperature data, e.g., along with other data points, such as precipitation, humidity, wind, etc. In machine learning domain, temperature data may be called a grain while additional (e.g. influential) data points may be called drivers. While temperature data (e.g. alone) may generate accurate predictions, other factors (e.g. drivers) that influence weather may improve the accuracy of weather predictions. Multiple variables (e.g. grain and one or more drivers) may be considered in a multivariate analysis, which involves observation and analysis of more than one statistical outcome variable at a time.

A prediction algorithm may be referred to as a forecast model. A prediction algorithm (e.g. and prefetching based on it) may be implemented, for example, per category and/or per key. In other words, different keys and/or different categories may utilize different models to predict what keys to prefetch and when to prefetch them. A (e.g. each) category and/or key may have different patterns and data seasonality.

A prediction algorithm may be optimized for short term prediction, for example, when cached requests may be short-lived with short TTLs. Seasonality may be detected, for example, based on seasonality patterns in requests (and/or key use). Seasonality may indicate, for example, usage patterns during business hours that slow outside business hours. Trends may be detected, for example, based on drivers. Cross-prediction may be performed, for example, based on similar information. In an example, multiple keys (e.g. in the same cache category) may have similar or identical patterns. An algorithm may be trained with separate but related series, permitting the resulting forecast model to predict the outcome of one series based on the behavior of another series, which may improve scalability.

Prediction algorithms may be optimized for a specific category or subset of keys. A forecast may have an origin that begins where a dataset ends. An origin may be set to the past, for example, to test forecasting against actual key use. Forecasting (e.g. what keys may be used) in the future for one or more time windows may be referred to as a horizon.

Training data (e.g. for a model) may be used to find a best performing algorithm on per category and key basis. A model may be trained by a training dataset. A training dataset may comprise a collection of observations (e.g. requests and/or key usage). Predictions may be made for new data when an actual outcome may not be known until a future time. Observations may be treated the same or differently in an analysis. Temporal dynamics may overcome "concept drift," such as by using more recent (e.g. last week, month or year of) observations rather than all data available. A time series dataset may differ from other datasets, for example, by having a time dimension. A time series may have an explicit order dependence between observations. A time dimension may comprise a constraint and a structure that provides a source of additional information.

A prefetch system may operate at large scale, for example, by distributing prefetch system operations. Prefetch operations (e.g. data aggregation, transformation, forecasting, scheduling and prefetching) may be scalable. Prefetch operations may be distributed among multiple computing devices (e.g. datacenter servers). Prefetching may not be bound to hardware or storage limitations, which may permit efficient processing of very large datasets while analyzing many different requests and keys for prefetch caching operations.

A key may index one or more queries/requests. The value of or in a key may comprise data that may be used to serve a query/request without obtaining the data from a source. A prefetch system may capture a timestamp for each key use/request. This may support a time-series representing the number of times each key is requested in a time window. Time series analysis may be used to predict if and when each key may be requested. Each cached key may have a TTL, which may be different from TTLs for other keys.

Forecast algorithms may have a precision indicator while forecast keys may have confidence indicators. Indicator values may, for example, range between 0 and 1. These indicators compared to configurable thresholds may influence prefetch decisions Historical use analyses may identify keys that were not accessed recently or as frequently in a prefetch system. Prefetch operations may be based on or bound to each specific time window where keys may be used. Usage of each key may be analyzed independently, in real-time, detecting usage patterns and trends to forecast specific time windows where each key may be used. Multiple levels of seasonality may be detected (e.g. hourly, daily, weekly, monthly, quarterly).

A prefetch system may use internal and external signals that can influence predictions based on usage patterns. An example of an internal signal may be an event or series of events that may (e.g. be known to) trigger one or more (e.g. a sequence of) subsequent events (e.g. influx of certain requests or reducing requests). Such a signal may be used to make prefetch determinations (e.g. to prefetch keys to serve requests stemming from subsequent events from the cache). An example of an external signal may be, for example, local weather, global events (e.g. political, sporting, entertainment, world news) or holiday season. These signals may influence usage patterns of incoming requests.

A prefetch system (e.g. as presented herein) that processes each key independently, for example, in real-time and in conjunction with internal and external signals, may (e.g. more accurately) capture the entire population of keys in the cache and (e.g. better) react to (e.g. sudden) changes that may result in prefetch deviations, attaining a higher cache hit ratio (e.g. compared to known techniques). Advantages may include a better user experience, for example, by speeding up query execution and/or by reducing operational costs.

FIG. 3 is a block diagram of an example prefetching architecture based on historical use and driver signals, according to an example embodiment. Prefetching (e.g. for L1 cache 125) may be implemented, for example, in multiple stages, such as, for example, data aggregation, data transformation, forecast analysis, prefetch scheduling and prefetching.

Example architecture 300 may be implemented, for example, by datacenter 305 comprising one or more data center servers, e.g., as shown by example in FIG. 1. As indicated in example architecture 300, a (e.g. each) server may be sliced into multiple virtual private servers (VPSs), each slice comprising a portion of available resources, for example, to process one or more workloads and/or to serve one or more customers/tenants (e.g. based on one or more SLAs). A slice may comprise multiple API gateway service (AGS) frontends (FEs), e.g., 312, 316, 324, on one or more data servers. As indicated in example architecture 300, work (e.g. stateless workload) related to determining what and/or when to prefetch may be distributed among one or more servers. In an example, AGS FE 324 may comprise cache reader 326, time series 328, drivers 336, data prefetcher 340 and prefetch listener 342. A stateless workload may comprise category configuration loader 322, forecast analyzer 332 and prefetch scheduler 344. AGS FEs 312 and 316 may be similarly configured.

In an example architecture (e.g. as shown in FIG. 3), time series data aggregation may be implemented, for example, by multiple AGS FEs, e.g., 312, 316, 324. In an example, each AGS FE 312, 316, 324 may aggregate a count of cache reads per category and key and stream that data in the background on a periodic basis. For example (e.g. in AGS FE 324), cache reader 326 may aggregate historical key use data from cache 334 and drivers 336 may aggregate real-time signals 314.

Signals 314 may provide insights that affect prefetch operations. For example, a signal may result in a time window shift or may eliminate prefetching of a key. In an example of logic that may analyze historical use data and real time data, signals 314 may represent current or prevailing conditions, such as an emergency that closed businesses for hours or for one or more days, which may reduce the likelihood that one or more requests will occur (e.g. as may be forecast based on historical data alone) and, therefore, reduce or eliminate a need for prefetched keys.

Cache reader 326 may aggregate usage data per category and per key. Aggregated historical key use data and real time signals may be merged into a time-series data stream by time series 328 and stored in time series database (DB) 330. Historical use data and real-time (e.g. driver) signals may be transformed (e.g. into a format accepted by a prediction model), for example, by indexing information in time series DB 330 based on category and time intervals, e.g., aggregated by key.

Forecast analysis and prefetch scheduling workloads may be distributed among servers (e.g. in datacenter 305). Forecast analysis may occur in a background process, for example, to predict and prefetch for upcoming time windows. Forecast analyzer 332 may analyze indexed use data and driver signals per category and per time interval to forecast prefetching what keys to prefetch for what time intervals. Forecast analyzer 332 may be configured and reconfigured (e.g. as needed) to forecast per category and/or per key per time interval. In an example, different models and/or different variables may be applied to forecast for different categories, keys and/or time intervals. Forecast analyzer configurations per category, key and/or time interval may be stored in configuration database 320. Configuration loader 322 may configure forecast analyzer as needed to forecast for a respective category and/or key based on configurations retrieved from configuration database 320. The results of forecasting may be stored in forecast DB 338.

Prefetch scheduler 344 may schedule prefetching prior to a predicted request window. Prefetch scheduler 344 may retrieve forecasting results from forecast DB 338. Prefetch scheduling may occur in a background process. In an example, prefetch scheduler 344 may schedule messages on service bus queue 346. A (e.g. each) message posted to service bus queue 346 may comprise, for example, a list of keys to prefetch, an enqueued timestamp (e.g. indicating when the message becomes visible) and a TTL (e.g. indicating a time interval the message is valid for before it is removed from the queue). Message scheduling times may be distributed or spread over a time window, for example, to avoid spikes in prefetch operations.

Prefetching operations for a prefetch load may be spread across multiple AGS FEs, e.g., 312, 316, 324, that process messages (e.g. on a first come, first serve basis) from service bus queue 346 as they become visible. In an example, prefetch listener 342 may provide prefetch messages to data prefetcher 340 as they become visible on service bus queue 346. Data prefetcher 340 may prefetch requested keys and store them in cache 334. In an example (e.g. with reference to FIG. 1), cache 334 may represent L1 cache 125. Data access endpoint 125 may (e.g. first) search L1 cache 125 for a key to construct a response to a request received from application 110.

An AGS FE may receive an operation that may be statically deemed a first operation of a predictable (e.g. well-known) sequence of operations, where any cacheable data to serve the upcoming operations may be (e.g. immediately) queued to prefetch. In an example, (e.g. static) signals 314 may come from AGS FEs and bypass the forecast pipeline, immediately resulting in operations to prefetch data. For example, an operation to create a group may precede a sequence of (e.g. predictable) operations, such as adding users to the group; creating/accessing files; creating/accessing messages. Metadata cacheable to serve those (e.g. predictable) upcoming operations may be retrieved and cached (e g immediately), bypassing the forecast pipeline (e.g. and avoiding overhead involved in going through the pipeline).

FIG. 4 is a block diagram of an example prefetching architecture based on historical use and driver signals, according to an example embodiment. Prefetching (e.g. for L1 cache 125) may be implemented, for example, in multiple stages, such as, for example, data aggregation, data transformation, forecast analysis, prefetch scheduling and prefetching.

Example architecture 400 may be implemented, for example, by datacenter 405 comprising one or more data center servers, e.g., as shown by example in FIG. 1. As indicated in example architecture 400, various prefetch operations may be distributed among one or more servers. A (e.g. each) server may be sliced into multiple VPSs, each slice comprising a portion of available resources, for example, to process one or more workloads and/or to serve one or more customers/tenants (e.g. based on one or more SLAs). A slice may comprise multiple API gateway service (AGS) frontends (FEs), e.g., 420, 422, 424, on one or more data servers.

In an example, data aggregation may be implemented, for example, by multiple AGS FEs, e.g., 420, 422, 424. In an example, each AGS FE 420, 422, 424 may aggregate a count of cache reads per category and per key. For example (e.g. in AGS FE 424), pre-aggregation 432 may aggregate historical key use data from cache 452. Pre-aggregation 432 may be configured by config 450, for example, regarding what historical data to collect for particular categories or keys. In an example, pre-aggregation 432 may be configured and reconfigured to collect data for different categories, keys and/or prediction algorithms (e.g. forecast analyzers). Aggregated historical data may be provided (e.g. streamed) to event hub 434. Driver signals 410 may (e.g. also) be provided (e.g. streamed) to event hub 434. Event hub 434 may comprise a streaming platform and event ingestion service. Event hub 434 may, for example, receive and process millions of events per second.

Historical use data and driver signal data sent to event hub 434 may be streamed to event hub capture 436 for storage (e.g. as a time series) in storage 438. In an example, historical key use data and real time signals data may be aggregated and stored per category and per key in storage 438. Storage 438 may comprise, for example, a data lake. In an example, a prefetch processing pipeline (e.g. based on historical key access data and driver signals) may have multiple layers of partitioning (e.g. for scaling). For example, a (e.g. each) key category may have an (e.g. a dedicated) event hub entity. A namespace for event hub 434 may have multiple (e.g. ten) entities, which may map to multiple (e.g. ten) categories (e.g. in support scaling and category isolation). An event hub entity may have multiple (e.g. 20) partitions. A partition may correspond to a customer/tenant that may process events. A number of partitions may be selected, for example, based on a data volume for a category. A (e.g. each) category may have its own service bus queue (e.g. for messages).

An operation to read a key from cache may be tracked as an observation (e.g. regardless whether it is a cache hit or miss). An observation may represent (e.g. store) a time that a given key was accessed (e.g. regardless whether it was a cache hit or miss). Observations may (e.g. for scaling purposes) be sampled in (e.g. small) time intervals (e.g. defined by configuration) before they are uploaded to Event Hub 434. Observations may be sampled, for example, by Pre-Aggregation 432. Such observations may provide a source of historical key use information.

Data transformer 440 may be applied to time series data stored in storage 438. Historical use data and real-time (e.g. driver) signals may be transformed, for example, into a format accepted by a prediction model. In an example, time series historical use data and real-time (e.g. driver) signals stored in storage 438 may be indexed in storage 442 based on category and time intervals, e.g., aggregated by key. In an (e.g. another) example, time series historical use data and real-time (e.g. driver) signals stored in storage 438 may be used to determine additional or alternative input data in a format expected by a forecast algorithm. Data transformer 440 may be configured and reconfigured (e.g. as needed) to transform time series data. In an example, data transformer 440 may be reconfigured for different forecast analyzers that may expect different input data and/or utilize different data stored in storage 438. Data transformer 440 may be configured and scaled by Data Transformer (DT) Background Process 426 (e.g. using one or more configurations stored in configuration DB 414). DT Background Process 426 may (e.g. also) be configured with one or more configurations stored in configuration DB 414. In an example, DT Background Process 426 may be implemented as a Databricks job, for example, to process data transformer workload as a background process. Databricks may support background jobs at scale, with cluster configurations set to run CPU intensive tasks in parallel with multiple servers and virtual machines (VMs).

Forecast analyzer 444 may process time series transformed data stored in storage 442 to forecast which keys should be prefetched and stored in cache 452 for one or more time intervals. Forecast analyzer 444 may analyze indexed use data and driver signals per category and per time interval to forecast what keys to prefetch to respond to future requests. The results of forecasting may be stored (e.g. as forecasts) in storage 446. Forecast analyzer 444 may be scaled by Forecast Analyzer (FA) Background Process 428, which may be configured in accordance with configuration DB 416. In an example, FA Background Process 428 may be implemented as a Databricks job.

Forecast analyzer 444 may be configured and reconfigured (e.g. as needed) to forecast per category and/or per key per time interval. In an example, different models and/or different variables may be applied to forecast for different categories, keys and/or time intervals. Forecast analyzer configurations per category, key and/or time interval may be stored in configuration DB 416. FA Background Process 428 may configure forecast analyzer 444 as needed to forecast for a respective category and/or key based on configurations retrieved from configuration DB 416.

Forecast analyzer 444 may be configured, for example, with a specific horizon. In various configurations, a horizon may comprise, for example, a number of time intervals, a number of minutes, hours or days. A horizon may be determined, for example, based on forecast accuracy. In an example, a "just in time" horizon (e.g. a number of minutes or time intervals) may be more accurate than a 24-hour horizon. A forecast model may be trained and use for one or more categories and/or one or more keys. A forecast model may be re-used for multiple keys or categories, for example, when they have the same or similar patterns. Prefetch forecast models may be trained, for example, with an exponential smoothing model or an autoregressive integrated moving average (ARIMA) model.

Real-time Forecast Analyzer (RFA) Background Process 412 may process aggregated data streamed from event hub 434 and transformed data stored in storage 442. RFA Background Process 412 may operate in parallel with forecast analyzer 444 and FA Background Process 428. Output from RFA Background Process 412 may be stored in storage 446 (e.g. along with forecasts generated by forecast analyzer 444). While FA Background Process 428 may run intermittently on a schedule, RFA Background Process 412 may run continuously to process incoming data and signals in (e.g. nearly) real-time. While the output may be similar in both background processes, the input streams may be different. RFA Background Process 412 may be lightweight, for example, using a short lookback window with a small dataset and more emphasis on real-time signals. RFA Background Process 412 may optimize for short-lived predictions, for example, to determine what keys need to be cached up to the next few (e.g. 10) minutes. RFA Background Process 412 may detect and react to sudden changes in usage trends or patterns. FA Background Process 428 may be more resource intensive, for example, by using a longer lookback window with a larger dataset. FA Background Process 428 may optimize for long-living predictions, for example, to determine keys to cache up to the next few (e.g. 8) hours.

Data prefetcher 448 may perform prefetching operations. Prefetching operations may be performed in the background (BG). Data prefetcher 448 may access forecasts stored in storage 446 to determine which keys to prefetch, when to prefetch them and how long their TTLs should be. Data prefetcher 448 may be configured by configuration loader 430, which may access configurations in configuration DB

418. Data prefetcher 448 may prefetch requested keys and store them in cache 452. In an example (e.g. with reference to FIG. 1), cache 452 may represent L1 cache 125. Data access endpoint 120 may (e.g. first) search L1 cache 125 for a key to construct a response to a request received from application 110.

In an example, prefetching operations may occur on one or more servers (e.g. one or more API gateway service (AGS) servers). In an example, prefetching operations may be distributed among multiple servers and performed as background operations. One or more configurations in configuration DB 418 may configure data prefetcher 448 to perform prefetch operations on one or more servers. Data prefetcher 448 may comprise a prefetch scheduler to schedule prefetching prior to a predicted request window. A prefetch scheduler may retrieve forecasting results from storage 446. Prefetch scheduling may occur in a background process. In an example, a prefetch scheduler may schedule prefetch operations, for example, by specifying a list of keys to prefetch, an indication when to prefetch and a TTL for a cached key. Prefetch scheduling times may be distributed or spread over a time window, for example, to avoid spikes in prefetch operations.

FIG. 5 is a block diagram of an example prefetching architecture based on historical use and driver signals, according to an example embodiment. Prefetching (e.g. for L1 cache 125) may be implemented, for example, in multiple stages, such as, for example, data aggregation, data transformation, forecast analysis, prefetch scheduling and prefetching.

Example architecture 500 may be implemented, for example, by datacenter 505 comprising one or more data center servers, e.g., as shown by example in FIG. 1. As indicated in example architecture 500, various prefetch operations may be distributed among one or more servers. A (e.g. each) server may be sliced into multiple VPSs, each slice comprising a portion of available resources, for example, to process one or more workloads and/or to serve one or more customers/tenants (e.g. based on one or more SLAs). A slice may comprise multiple API gateway service (AGS) frontends (FEs), e.g., 520, 522, 524, on one or more data servers.

In an example, data aggregation may be implemented, for example, by multiple AGS FEs, e.g., 520, 522, 524. In an example, each AGS FE 520, 522, 524 may aggregate a count of cache reads per category and per key. For example (e.g. in AGS FE 524), pre-aggregation 532 may aggregate historical key use data from cache 552. Pre-aggregation 532 may be configured by config 550, for example, regarding what historical data to collect for particular categories or keys. In an example, pre-aggregation 532 may be configured and reconfigured to collect data for different categories, keys and/or prediction algorithms (e.g. forecast analyzers). Aggregated historical data may be provided (e.g. streamed) to event hub 534. Driver signals 510 may (e.g. also) be provided (e.g. streamed) to event hub 534. Event hub 534 may comprise a streaming platform and event ingestion service. Event hub 534 may, for example, receive and process millions of events per second.

Historical use data and driver signal data sent to event hub 534 may be streamed to event hub capture 536 for storage (e.g. as a time series) in storage 538. In an example, historical key use data and real time signals data may be aggregated and stored per category and per key in storage 538. Storage 538 may comprise, for example, a data lake. In an example, a prefetch processing pipeline (e.g. based on historical key access data and driver signals) may have multiple layers of partitioning (e.g. for scaling). For example, a (e.g. each) key category may have an (e.g. a dedicated) event hub entity. A namespace for event hub 534 may have multiple (e.g. ten) entities, which may map to multiple (e.g. ten) categories (e.g. in support scaling and category isolation). An event hub entity may have multiple (e.g. 20) partitions. A partition may correspond to a customer/tenant that may process events. A number of partitions may be selected, for example, based on a data volume for a category. A (e.g. each) category may have its own service bus queue (e.g. for messages).

An operation to read a key from cache may be tracked as an observation (e.g. regardless whether it is a cache hit or miss). An observation may represent (e.g. store) a time that a given key was accessed (e.g. regardless whether it was a cache hit or miss). Observations may (e.g. for scaling purposes) be sampled in (e.g. small) time intervals (e.g. defined by configuration) before they are uploaded to Event Hub 434. Observations may be sampled, for example, by Pre-Aggregation 432. Such observations may provide a source of historical key use information.

Data transformer 540 may be applied to time series data stored in storage 538. Historical use data and real-time (e.g. driver) signals may be transformed, for example, into a format accepted by a prediction model. In an example, time series historical use data and real-time (e.g. driver) signals stored in storage 538 may be indexed in storage 542 based on category and time intervals, e.g., aggregated by key. In an (e.g. another) example, time series historical use data and real-time (e.g. driver) signals stored in storage 538 may be used to determine additional or alternative input data in a format expected by a forecast algorithm. Data transformer 540 may be configured and reconfigured (e.g. as needed) to transform time series data. In an example, data transformer 540 may be reconfigured for different forecast analyzers that may expect different input data and/or utilize different data stored in storage 538. Data transformer 540 may be configured and scaled by Data Transformer (DT) Background Process 526 (e.g. using one or more configurations stored in configuration DB 514). DT Background Process 526 may (e.g. also) be configured with one or more configurations stored in configuration DB 514. In an example, DT Background Process 526 may be implemented as a Databricks job. Databricks may support background jobs at scale, with cluster configurations set to run CPU intensive tasks in parallel with multiple servers and virtual machines (VMs).

Forecast analyzer 544 may process time series transformed data stored in storage 542 to forecast which keys should be prefetched and stored in cache 552 for one or more time intervals. Forecast analyzer 544 may analyze indexed use data and driver signals per category and per time interval to forecast what keys to prefetch to respond to future requests. The results of forecasting may be stored (e.g. as forecasts) in storage 546. Forecast analyzer 544 may be scaled by Forecast Analyzer (FA) Background Process 528, which may be configured in accordance with configuration DB 516. In an example, FA Background Process 528 may be implemented as a Databricks job.

Forecast analysis may comprise multiple forecasting pipelines. For example, there may be a pipeline for streaming data from an event hub to a Databricks job that may be optimized for just in time predictions. There may be a pipeline for a full spectrum of data transformed and stored in storage (e.g. a data lake). A background job may be scheduled to run on a periodic basis to perform a forecasting analysis. The forecasting analysis may (e.g. for each category registered for prefetching) execute the analysis for an upcoming time window (e.g. horizon) and write forecast results in forecast storage 546. The horizon and other parameters used by a forecast model may be defined per category and may be provided by config DB 516.

Forecast analyzer 544 may be configured and reconfigured (e.g. as needed) to forecast per category and/or per key per time interval. In an example, different models and/or different variables may be applied to forecast for different categories, keys and/or time intervals. Forecast analyzer configurations per category, key and/or time interval may be stored in configuration DB 516. FA Background Process 528 may configure forecast analyzer 544 as needed to forecast for a respective category and/or key based on configurations retrieved from configuration DB 516.

Forecast analyzer 544 may be configured, for example, with a specific horizon. In various configurations, a horizon may comprise, for example, a number of time intervals, a number of minutes, hours or days. A horizon may be determined, for example, based on forecast accuracy. In an example, a "just in time" horizon (e.g. a number of minutes or time intervals) may be more accurate than a 24-hour horizon. A forecast model may be trained and use for one or more categories and/or one or more keys. A forecast model may be re-used for multiple keys or categories, for example, when they have the same or similar patterns. Prefetch forecast models may be trained, for example, with an exponential smoothing model or an autoregressive integrated moving average (ARIMA) model.

Real-time Forecast Analyzer (RFA) Background Process 512 may process aggregated data streamed from event hub 534 and transformed data stored in storage 542. RFA Background Process 512 may operate in parallel with forecast analyzer 544 and FA Background Process 528. Output from RFA Background Process 512 may be stored in storage 546 (e.g. along with forecasts generated by forecast analyzer 544). While FA Background Process 528 may run intermittently on a schedule, RFA Background Process 512 may run continuously to process incoming data and signals in (e.g. nearly) real-time. While the output may be similar in both background processes, the input streams may be different. RFA Background Process 512 may be lightweight, for example, using a short lookback window with a small dataset and more emphasis on real-time signals. RFA Background Process 512 may optimize for short-lived predictions, for example, to determine what keys need to be cached up to the next few (e.g. 10) minutes. RFA Background Process 512 may detect and react to sudden changes in usage trends or patterns. FA Background Process 528 may be more resource intensive, for example, by using a longer lookback window with a larger dataset. FA Background Process 528 may optimize for long-living predictions, for example, to determine keys to cache up to the next few (e.g. 8) hours.

Prefetch scheduler 558 may schedule prefetching prior to a predicted request window. Scheduler 558 may retrieve forecasts from storage 546. Scheduler 558 may perform scheduling operations in a background process. Scheduler 558 may be configured by Scheduler Background Process 556, which may access configurations in configuration DB 554. In an example, scheduler 558 may schedule differently, for example, for different categories. In an example, scheduler 558 may schedule messages on service bus queue 560. A (e.g. each) message posted to service bus queue 560 may comprise, for example, a list of keys to prefetch, an enqueued timestamp (e.g. indicating when the message becomes visible) and a TTL (e.g. indicating a time interval the message is valid for before it is removed from the queue). Message scheduling times may be distributed or spread over a time window, for example, to avoid spikes in prefetch operations. Scheduler 558 may be scaled by Scheduler Background Process 556, which may be configured in accordance with configuration DB 554. In an example, Scheduler Background Process 556 may be implemented as a Databricks job.

Prefetching operations may be spread across multiple AGS FEs, e.g., 520, 522, 524. Prefetching operations may be performed in the background (BG). Messages from service bus queue 560 may be processed as they become visible, for example, on a first come, first serve basis. Prefetch scheduling times may be distributed or spread over a time window, for example, to avoid spikes in prefetch operations. For example, prefetcher 562 may prefetch requested keys and store them in cache 552. In an example (e.g. with reference to FIG. 1), cache 552 may represent L1 cache 125. Data access endpoint 125 may (e.g. first) search L1 cache 125 for a key to construct a response to a request received from application 110.

Figure 6:
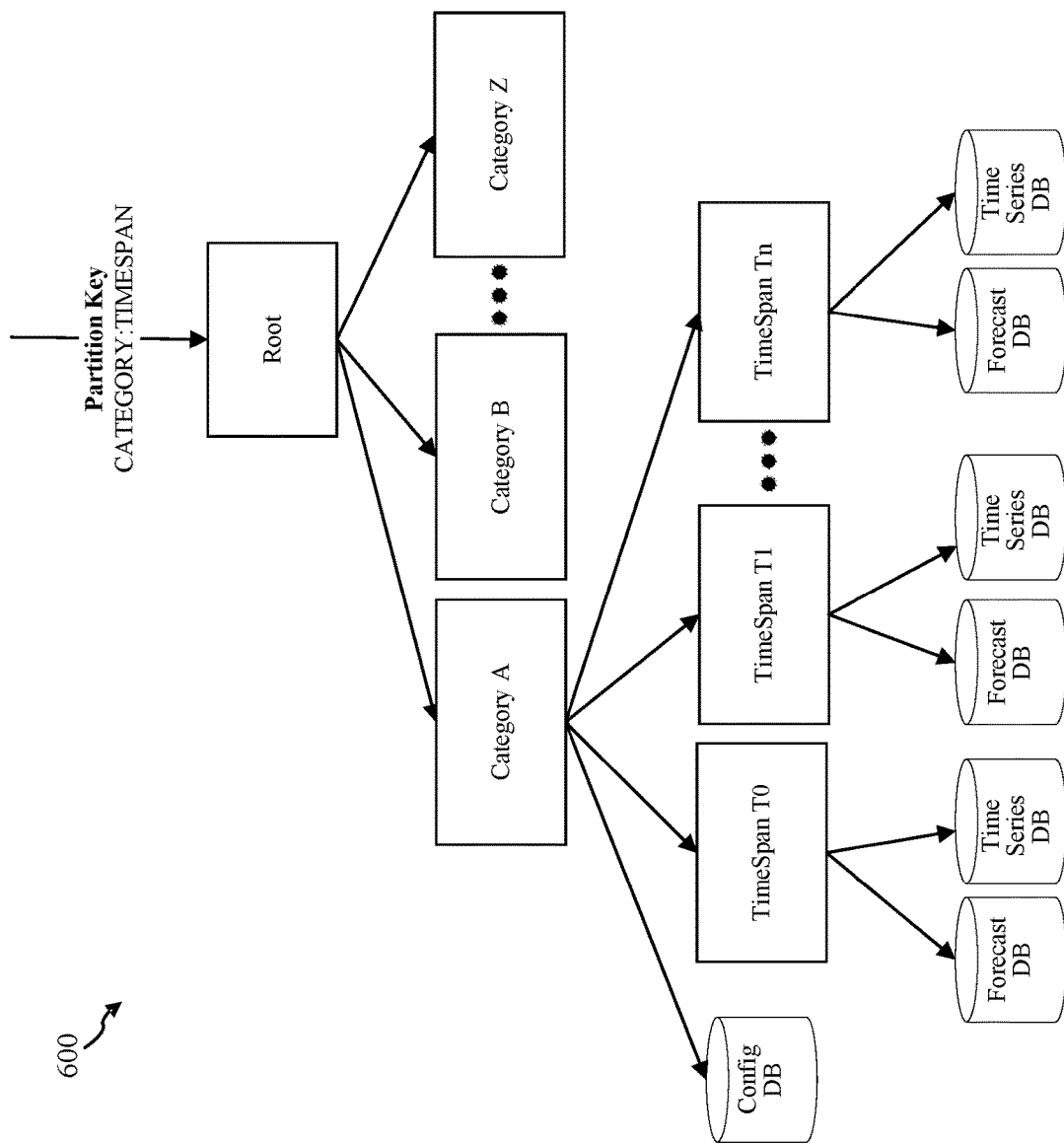
FIG. 6 is a block diagram of an example of indexing data by category and time intervals, according to an example embodiment.

FIG. 6 is a block diagram of an example of indexing data by category and time intervals, according to an example embodiment. A pipeline, including storage, may be partitioned, for example, in support of scaling. Each category may have its own service bus queue. Each queue (e.g. and messages in a queue) may have (e.g. configurable) size constraints. Storage (e.g. data lakes) may index data, for example, by category. Indexing example 600 shows one of many possible indexing arrangements. In an example (e.g. as shown in FIG. 6), indexing may leverage a file system hierarchy (e.g. directory folders). For example, information pertaining to a category (e.g. historical key use data, real time or driver signal data, configurations, forecasts and so on) may be aggregated and stored (e.g. in folders) per category (e.g. category A, category B, . . . category Z) under a root folder. Keys may be placed in categories may be selected, for example, based on commonalities (e.g. keys with common access patterns and so on). A category may comprise one or more keys. A (e.g. each) category may be partitioned by a configuration and timespans (e.g. TimeSpan T0, TimeSpan T1, . . . Timespan Tn). A (e.g. each) timespan may be partitioned by a forecast database and a time series database. A time series database may store, for example, historical key usage data and real time or driver signals for a respective timespan.

Implementations are not limited to the examples shown. Any number of computing devices and/or servers (including but not limited to machines and/or virtual machines) may be coupled in any manner via any type of computing environment. For example, one or more of computing device, server or storage components may be co-located, located remote from each other, combined or integrated on or distributed across one or more real or virtual machines. Examples shown and discussed with respect to FIGS. 1-6 may operate, for example, according to example methods presented in FIGS. 7A-C and FIG. 8.

FIGS. 7A-C show an example data and process flow diagram for prefetching based on historical use and real-time data, according to an example embodiment. FIGS. 7A-C present one of many data and process flows for data aggregation, prefetch forecasting and prefetch scheduling. No order of steps is required unless expressly indicated or inherently required. There is no requirement that a data and process flow implement all of the steps illustrated in FIGS. 7A-C. FIGS. 7A-C are simply one of many possible embodiments. Embodiments may implement fewer, more or alternative data and process flow components.

An example data and process flow diagram 700A, 700B and 700C may comprise, for example, data aggregation 702, forecasting 716, forecasting per key 734, scheduling 756 and scheduling per key 772. The example shown in FIGS. 7A-C does not address data transformation, prefetching or request/ query response.

Information involved in a prefetch prediction data and process flow may comprise, for example, historical usage data 714, real-time or driver signals 738, category 704, lookback 706, interval 708, indexed time offset 710, horizon 720, trained models 740, forecast runtime 742, confidence threshold 748, and schedule time offset 776.

Historical usage data may comprise timestamped data indicating when a key was used to respond to a request.

Real-time or driver signals may comprise any signal other than historical use data that may influence the likelihood of a key and/or category of keys being needed to respond to one or more future requests.

A key may comprise (e.g. hashed) data (e.g. metadata) that may be used to respond to one or more requests.

A category may comprise a cache category for which prediction and prefetching may be applied. A category may comprise information (e.g. representations, usage, forecasts) for one or more keys that may be grouped in the category (e.g. based on one or more similarities, such as the same or similar access patterns).

A lookback may comprise a time window in the past, e.g., to determine historical key use patterns that may be used to train a model to predict the future in a forecast process. A lookback may be timeless, bound to computational limits to process the data.

An interval may be used to aggregate and index data in time intervals (e.g. aggregate and index historical key use data in 5-minute samples), for example, to reduce computation cycles, consumption of memory and storage resources.

An Indexed Time Offset may comprise a configuration used to aggregate and index data on different time intervals for a category, for example, to support uniform distribution of prefetch operations across different categories. In an example (e.g. where category A and B use the same aggregation interval), category B may use a different offset such that prefetch operations are scheduled in different time window than prefetch operations for category A.

A horizon may comprise a time window in the future where one or more predictions may be made about what keys may be used.

A forecast model may be used to forecast keys that may be needed for future requests in one or more time intervals of a forecast horizon. A forecast model may be optimized for use with one or more keys and/or categories that may have the same or similar use patterns and seasonalities.

Machine learning and forecast models may be trainable, where a training step may precede the forecast step. A forecast function may use the output of a training step as input. A forecast function may be optimized to be a (e.g. very) lightweight process. A training step may be very resource intensive and slow, but training may not need to run very frequently. The accuracy of a forecast model may be improved with more frequent retraining. Training and retraining may involve analyzing a large dataset (e.g. all historical usage and signals for previous year) to detect what patterns, trends and seasonality the data exposes. These parameters discovered during training and retraining may be provided as input to a forecast evaluation function. Some forecast functions may work without a trained model.

A confidence threshold may comprise a threshold (e.g. between 0 and 1) that represents a minimum confidence required for a key to be selected for prefetch. A change in threshold configuration may be reflected in precision and recall metrics and (e.g. therefore) output (e.g. keys to prefetch). In an example of a forecast algorithm, when a confidence threshold increases, precision may increase and recall may decrease (e.g. due to decreased cache hit ratio). A decrease in a confidence threshold may result in increased recall (e.g. increased cache hit ratio) and decreased precision.

A Schedule Time Offset may comprise a maximum timespan used to compute a scheduling start time of prefetch operations for a category, for example, to enable uniform distribution of prefetch operations within a timespan. In an example where a key may be expected to be needed between 9:00 and 10:00 and where an offset is −10 minutes, a key may be scheduled with a start time between 8:50 to 9:00. Multiple keys with the same schedule may be distributed evenly over a time window.

FIG. 7A shows an example of data aggregation. Data aggregation 702 may comprise aggregation process 712, which may be distributed, for example, among multiple servers. Inputs to aggregation process 712 may comprise, for example, category 702, lookback 706, interval 708 and indexed time offset 710. Aggregation process 712 (e.g. implemented on multiple servers) may search for and aggregate information about keys accessed to create responses to requests/queries. Category 704 may indicate to aggregation process 712 what categories of keys to search for. Lookback 706 may indicate to aggregation process 712 how far back to look. For example, aggregation process 712 may ignore key use data with a timestamp earlier than indicated by lookback 706. Interval 708 may indicate to aggregation process 712 time intervals to aggregate historical use information. Indexed time offset 710 may indicate to aggregation process 712 a shift in the aggregation interval for a category. Aggregation process 712 may store aggregated data as historical usage data 714, for example, in accordance with the example shown in FIG. 6.

FIG. 7B shows an example of prefetch forecasting. Forecasting 716 may comprise forecast process 718, which may be distributed for example, among multiple servers. Inputs to forecast process 718 may comprise, for example, category 704, lookback 706, interval 708, indexed time offset 710, horizon 720, historical usage data 714, trained models 740, forecast runtime 742 and confidence threshold 748. Forecast process 718 may make forecasts per category and/or key. Forecast process 718 may use models trained on usage data in lookback window 706. Forecast process 718 may make forecasts per category or key per time interval 708. Forecast process 718 may forecast per key 734 for each interval 722 in horizon 720 for each key 732 in the population of keys accessed in the lookback window 730.

The forecast function (forecast 744) may take a corresponding trained model from trained models 740 and forecast runtime 742 as input to perform predictions based on historical usage data 714 and real-time signals 738. A background process may use historical data to train and optimize forecast runtime 742 and trained models 740. The background process may map models to categories and/or keys. The background process may compute metrics (e.g. precision, recall) for each model, for example, by comparing historical usage with forecasts.

A confidence indicator 746 may be generated for the forecast 744. A decision 750 may be made whether confidence indicator 746 for the forecast 744 is above a confidence threshold 748. The forecast key may be discarded 752 when confidence indicator 746 for the forecast 744 is below confidence threshold 748. The forecast key may be selected (e.g. for prefetching) 752 when confidence indicator 746 for the forecast 744 is above confidence threshold 748. The confidence threshold comparison decision process (e.g. to discard or select for prefetching) may occur for each forecast key 724. Decision process per key 724 may accumulate a list of keys to prefetch 726, which may be stored as forecasts 728.

FIG. 7C shows an example of prefetch scheduling. Scheduling 756 may comprise schedule process 758, which may be distributed, for example, among multiple servers. Inputs to scheduling process 756 may comprise, for example, category 704, lookback 706, interval 708, indexed time offset 710, horizon 720, forecasts 728 and scheduled time offset 776. Scheduling process 758 may schedule per key 772 for each interval 762 in horizon 720 for each key 770 in the list of keys to prefetch 768. Schedule parameters may be computed 778 (e.g. based on any schedule time offset 776) for key forecasts 728. Schedule parameters may include, for example, start time 780 and time to live (TTL) 782. Scheduling per key 764 may be pushed to queue 766, which may be distributed, for example, among multiple servers.

A prefetching system may be improved, for example, based on metrics. Metrics may be applied to monitor prefetching system performance. Metrics may comprise, for example, cache miss ratio, request latency, coverage, accuracy and timeliness. Coverage may comprise the fraction of total misses eliminated by prefetching. Accuracy may be the fraction of total prefetches that were useful (e.g. ratio of number of keys prefetched and actually requested compared to total prefetches. Timeliness may be a difference in time between key prefetch and use.

FIG. 8 shows a flowchart of a method for prefetching based on historical data and real time signals, according to an example embodiment. Embodiments disclosed herein and other embodiments may operate in accordance with example method 800. Method 800 comprises steps 802-820. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 8. FIG. 8 is simply one of many possible embodiments. Embodiments may implement fewer, more or different steps.

Method 800 comprises step 802. In step 802, historical use data may be aggregated from distributed computing devices as time series data for each key. For example, as shown in FIGS. 3-6 and 7A-C, one or more servers (e.g. AGS FEs) may aggregate historical use data.

In step 804, historical use data may be indexed by cache categories and time intervals. For example, as shown in FIGS. 3-6 and 7A-C, historical use data may be indexed in storage by cache categories and cache categories may be indexed by timespan, with forecasts and historical time series data stored indexed to timespans.

In step 806, real-time signals (e.g. that indicate prevailing conditions) that may affect forecasts may be monitored. For example, as shown in FIGS. 3-5 and 7A-C, signals 314, 410, 510, 738 may be monitored.

In step 808, forecasts may be generated to indicate whether to prefetch keys for potential future requests during future time intervals based on the historical use data and real-time signals. For example, as shown in FIGS. 3-5 and 7A-C, forecast analyzer 332, 444, 544, forecast runtime 742, trained models 740 may generate forecasts (e.g. forecast 744) to indicate whether to prefetch keys.

In step 810, a confidence indicator may be generated for each forecast. For example, as shown in FIG. 7B, confidence indicator 746 may be generated for forecast 744.

In step 812, each confidence indicator may be compared to a configurable confidence threshold. For example, as shown in FIG. 7B, confidence indicator 746 may be compared 750 to confidence threshold 748.

In step 814, a determination may be made whether to prefetch a key based on the forecast and the comparison. For example, as shown in FIG. 7B, a determination may be made whether to select a key 754 or discard a key 752 based on forecast 744 and comparison 750.

In step 816, prefetch operations may be scheduled (e.g. for distributed execution). For example, as shown in FIGS. 3, 5 and 7A-C, prefetch scheduler 344, scheduler 558, scheduling 756 and scheduling per key 772 may schedule prefetch operations.

In step 818, a time to live (TTL) may be assigned to each key independent of TTLs for other keys. For example, as shown in FIGS. 3, 5 and 7A-C, prefetch scheduler 344, scheduler 558, scheduling 756 and scheduling per key 772 may assign a TTL to each key independent of assigning TTLs to other keys.

In step 820, prefetch operations may be distributed to a plurality of computing devices. For example, as shown in FIGS. 3, 5 and 7C, servers (e.g. data center server 160 and 165) may perform prefetch operations based on messages in service bus queue 346, 560 or 766.

III. Example Computing Device Embodiments

As noted herein, the embodiments described, along with any modules, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

FIG. 9 shows an exemplary implementation of a computing device 900 in which example embodiments may be implemented. Consistent with all other descriptions provided herein, the description of computing device 900 is a non-limiting example for purposes of illustration. Example embodiments may be implemented in other types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing example embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of example embodiments described herein. Accordingly, such computer programs represent controllers of the computing device 900.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

Methods, systems and computer program products are provided for prefetching based on historical use and real-time signals. Forecast models may be configured to forecast whether to prefetch information (e.g. keys responsive to queries) for future time intervals based on historical use and internal or external signals that may influence forecasts, such as prevailing conditions. Historical use of keys may be analyzed for patterns and trends with multiple seasonalities per category and/or per key. Time series data and forecasts may be indexed by cache categories and time intervals. Forecast models may be trainable, optimizable, configurable and/or auto-correcting on a per-category and/or a per-key basis. Forecast precision indicators, confidence indicators and configurable thresholds may be used to optimize performance. Operations (e.g. data aggregation, transformation, forecasting, scheduling and prefetching) may be distributed among multiple servers. Tasks may be time-distributed by offsets. Cached information may be assigned a time to live (TTL) independent of other cached information.

In an example, a method for prefetching based on historical use and real-time signals may comprise, for example, generating, by at least one forecast model for each of a plurality of future time intervals, a plurality of forecasts indicating whether to prefetch any of a plurality of information for a plurality of potential future requests during the plurality of future time intervals based on: historical use data for the plurality of information for past requests during one or more past time intervals; and an indicator that influences a likelihood of occurrence of each of the plurality of potential future requests during at least one of the plurality of future time intervals; and determining whether to prefetch any of the plurality of information based on the plurality of forecasts.

In an example, the method may further comprise, for example, generating a first confidence indicator for a first forecast to prefetch a first information for a future first time interval for a first potential future request; determining whether the first confidence indicator is equal to or greater than a confidence threshold; and determining whether to prefetch the first information for the future first time interval based on the first forecast and the determination.

In an example, the method may further comprise, for example, determining a time to live (TTL) in cache for each information independent of a determination of a TTL in cache for other information.

In an example, the plurality of information may comprise a plurality of keys, where each key comprises information useful to provide a response to a request.

In an example, the method may further comprise, for example, aggregating the historical use data; indexing the historical use data by cache categories; and indexing the cache categories by the past time intervals.

In an example, the method may further comprise, for example, applying an index offset time to the past time intervals of a first cache category when the first cache category and a second cache category have matching indexed past time intervals.

In an example, at least a portion of the method may be distributed among a plurality of computing devices. The method further comprise, for example, distributing the aggregation of the historical use data among the plurality of computing devices by at least one of indexed categories and indexed time intervals.

In an example, the method may further comprise, for example, scheduling a plurality of prefetch operations at a plurality of scheduled prefetch times for the plurality of information based on the plurality of forecasts.

In an example, the method may further comprise, for example, applying a scheduling time offset to a first scheduled prefetch time for a first information when the first information has a same time to live (TTL) as a second information.

In an example, the method may further comprise, for example, distributing the plurality of prefetch operations among the plurality of computing devices by at least one of indexed categories and indexed time intervals.

In an example, the method may further comprise, for example, generating, by a first forecast model with a first configuration, a first forecast for a first information or a first category of information; and generating, by the first forecast model with a second configuration or by a second forecast model, a second forecast for a second information or a second category of information.

In an example, the indicator may comprise real-time data indicating a prevailing condition that may affect requests when the plurality of forecasts are generated.

In an example, a prefetch system may comprise, for example, one or more processors; and one or more memory devices that store program code configured to be executed by the one or more processors. Program code may comprise, for example, a forecast analyzer and a prefetcher. A forecast analyzer may be configured to generate, for each of a plurality of future time intervals, a plurality of forecasts indicating whether to prefetch any of a plurality of information for a plurality of potential future requests during the plurality of future time intervals based on, for example, historical use data for the plurality of information for past requests during one or more past time intervals. A prefetcher may be configured to distribute a plurality of prefetch operations for the plurality of information based on the plurality of forecasts among a plurality of computing devices.

In an example, the forecast analyzer may be configured to generate the plurality of forecasts based on the historical use data; and an indicator that influences a likelihood of occurrence of each of the plurality of potential future requests during at least one of the plurality of future time intervals.

In an example, the prefetch system may further comprise, for example, an aggregator configured to: aggregate the historical use data; index the historical use data by cache categories; and index the cache categories by the past time intervals.

In an example, the prefetch system may further comprise, for example, a scheduler configured to: schedule a time to live (TTL) in cache for each information independent of a determination of a TTL in cache for other information.

In an example, the forecast analyzer may be further configured to: generate a first confidence indicator for a first forecast to prefetch a first information for a future first time interval for a first potential future request; determine whether the first confidence indicator is equal to or greater than a confidence threshold; and determine whether to prefetch the first information for the future first time interval based on the first forecast and the determination.

In an example, a computer-readable storage medium may have program instructions recorded thereon that, when executed by a processing circuit, perform a method. The method may comprise, for example, aggregating, by a plurality of distributed computing devices, historical use data for a plurality of information for past requests during one or more past time intervals; generating, by at least one forecast model for each of a plurality of future time intervals, a plurality of forecasts indicating whether to prefetch any of a plurality of information for a plurality of potential future requests during the plurality of future time intervals based on the historical use data; and determining whether to prefetch and cache any of the plurality of information based on the plurality of forecasts.

In an example, the method may further comprise, for example, generating the plurality of forecasts based on: the historical use data; and an indicator that influences a likelihood of occurrence of each of the plurality of potential future requests during at least one of the plurality of future time intervals.

In an example, the method may further comprise, for example, generating, by a first forecast model with a first configuration, a first forecast for a first information or a first category of information; and generating, by the first forecast model with a second configuration or by a second forecast model, a second forecast for a second information or a second category of information.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:
generating, by at least one forecast model for each of a plurality of future time intervals, a plurality of forecasts indicating which keys of a plurality of keys to prefetch from a source for which of the plurality of future time intervals, wherein prefetched keys are to be utilized by a server to construct future responses for a plurality of potential future requests during the plurality of future time intervals, wherein said which keys and said which future time intervals are forecasted based on:
 (1) pattern analysis of historical key use data relating to prior keys utilized by the server for constructing prior responses to past requests during one or more past time intervals; and
 (2) a received real-time signal representing an external real-world condition that influences a likelihood of occurrence of at least one of the plurality of potential future requests being issued;
determining whether to prefetch any of the keys based on the plurality of forecasts; and
in response to determining to prefetch a first key of the plurality of keys based on the forecast, prefetching the first key from the source and storing the first key in a cache utilized by the server for constructing a response to a first potential future request without obtaining the first key from the source.

2. The method of claim 1, further comprising:
generating a first confidence indicator for a first forecast to prefetch a second key for a future first time interval for a second potential future request;
determining whether the first confidence indicator is equal to or greater than a confidence threshold; and
determining whether to prefetch the second key for the future first time interval based on the first forecast and the determination.

3. The method of claim 1, further comprising:
determining a time to live (TTL) in cache for each prefetched key independent of a determination of a TTL in cache for other prefetched keys.

4. The method of claim 1, wherein each key of the plurality of keys comprises information useful to provide a response to a request.

5. The method of claim 1, further comprising:
aggregating the historical key use data;
indexing the historical key use data by cache categories; and
indexing the cache categories by the past time intervals.

6. The method of claim 5, further comprising:
applying an index offset time to the past time intervals of a first cache category when the first cache category and a second cache category have matching indexed past time intervals.

7. The method of claim 5, wherein at least a portion of the method is distributed among a plurality of computing devices, the method further comprising:
distributing the aggregation of the historical key use data among the plurality of computing devices by at least one of indexed categories and indexed time intervals.

8. The method of claim 1, further comprising:
scheduling a plurality of prefetch operations at a plurality of scheduled prefetch times for prefetching the keys based on the plurality of forecasts.

9. The method of claim 8, further comprising:
applying a scheduling time offset to a first scheduled prefetch time for the first key when the first key has a same time to live (TTL) as a third key.

10. The method of claim 8, wherein at least a portion of the method is distributed among a plurality of computing devices, the method further comprising:
distributing the plurality of prefetch operations among the plurality of computing devices by at least one of indexed categories and indexed time intervals.

11. The method of claim 1, further comprising:
generating, by a first forecast model with a first configuration, a second forecast for a fourth key or a first category of information; and
generating, by the first forecast model with a second configuration or by a second forecast model, a third forecast for a fifth key or a second category of information.

12. The method of claim 1, wherein the real-time signal representing the external real-world condition represents an emergency that closes a business and affects whether the at least one of the plurality of potential future requests occurs during a corresponding one of the plurality of future time intervals.

13. A prefetch system, comprising:
one or more processors; and
one or more memory devices that store program code configured to be executed by the one or more processors, the program code comprising:
a forecast analyzer configured to generate, for each of a plurality of future time intervals, a plurality of respective forecasts indicating which keys of a plurality of keys to prefetch from a source, wherein the prefetched keys are to be utilized to construct future responses for a plurality of potential future requests during the plurality of future time intervals, and wherein said plurality of respective forecasts indicating which keys to prefetch are based on:
pattern analysis of historical key use data relating to prior keys utilized for constructing prior responses to past requests during one or more past time intervals; and
a prefetcher configured to distribute a plurality of prefetch operations for prefetching the keys of the plurality of keys based on the plurality of forecasts among a plurality of computing devices, wherein each of the plurality of computing devices prefetches a respective key from the source and stores the respective key in a respective cache utilized by each respective computing device for constructing a response to a respective potential future request without obtaining the respective key from the source.

14. The prefetch system of claim 13, wherein said plurality of respective forecasts indicating which keys to prefetch are forecasted based on:
 (1) the pattern analysis of the historical key use data relating to the prior keys utilized for constructing the prior responses to the past requests during the one or more past time intervals; and (2) a received real-time signal representing an external real-world condition that influences a likelihood of occurrence of at least one of the plurality of potential future requests being issued during at least one of the plurality of future time intervals.

15. The prefetch system of claim 13, further comprising:
an aggregator configured to:
   aggregate the historical key use data;
   index the historical key use data by cache categories; and
   index the cache categories by the past time intervals.

16. The prefetch system of claim 13, further comprising:
a scheduler configured to:
   schedule a time to live (TTL) in cache for each prefetched key independent of a determination of a TTL in cache for other prefetched keys.

17. The prefetch system of claim 13, wherein the forecast analyzer is further configured to:
   generate a first confidence indicator for a first forecast to prefetch a first key for a future first time interval for a first potential future request;
   determine whether the first confidence indicator is equal to or greater than a confidence threshold; and
   determine whether to prefetch the first key for the future first time interval based on the first forecast and the determination.

18. A computer-readable storage medium having program instructions recorded thereon that, when executed by a processing circuit, perform a method comprising:
   aggregating, by a plurality of distributed computing devices, historical key use data for a plurality of keys for past requests during one or more past time intervals;
   generating, by at least one forecast model for each of a plurality of future time intervals, a plurality of forecasts indicating which keys of a plurality of information keys to prefetch from a source for which of the plurality of future time intervals, wherein prefetched keys are to be utilized by a server to construct future responses for a plurality of potential future requests during the plurality of future time intervals, wherein said which keys and said which future time intervals are forecasted based on;
   pattern analysis of the historical key use data relating to prior keys utilized by the server for constructing prior responses to past requests during one or more past time intervals;
   determining whether to prefetch and cache any of the keys based on the plurality of forecasts; and
   in response to determining to prefetch and cache a first key of the plurality of keys based on the forecast, prefetching the first key from the source and storing the first key in a cache utilized by the server for constructing a response to a first potential future request without obtaining the first key from the source.

19. The computer-readable storage medium of claim 18, wherein said which keys and said which future time intervals are forecasted based on:
   (1) the pattern analysis of the historical key use data relating to the prior keys utilized by the server for constructing the prior responses to past requests during the one or more past time intervals; and
   (2) a received real-time signal representing an external real-world condition that influences a likelihood of occurrence of at least one of the plurality of potential future requests being issued during at least one of the plurality of future time intervals.

20. The computer-readable storage medium of claim 18, the method further comprising:
   generating, by a first forecast model with a first configuration, a first forecast for a second key or a first category of information; and
   generating, by the first forecast model with a second configuration or by a second forecast model, a second forecast for a third key or a second category of information.

\* \* \* \* \*